(12) United States Patent
Dash et al.

(10) Patent No.: US 12,513,591 B2
(45) Date of Patent: Dec. 30, 2025

(54) RECONFIGURABLE MULTI-RADIO BRIDGE

(71) Applicant: MaxLinear, Inc., Carlsbad, CA (US)

(72) Inventors: Debashis Dash, Newark, CA (US);
Hossein Dehghan-Fard, Diablo, CA (US); Simon Duxbury, Piedmont, CA (US); Wanjui Ho, Fremont, CA (US)

(73) Assignee: MaxLinear, Inc., Carlsbad, CA (US)

( * ) Notice: Subject to any disclaimer, the term of this patent is extended or adjusted under 35 U.S.C. 154(b) by 306 days.

(21) Appl. No.: 17/521,635

(22) Filed: Nov. 8, 2021

(65) Prior Publication Data

US 2022/0070756 A1 Mar. 3, 2022

Related U.S. Application Data

(63) Continuation of application No. 16/671,149, filed on Oct. 31, 2019, now Pat. No. 11,202,243.

(Continued)

(51) Int. Cl.
*H04W 40/02* (2009.01)
*H04W 40/24* (2009.01)
*H04W 84/12* (2009.01)

(52) U.S. Cl.
CPC ......... *H04W 40/02* (2013.01); *H04W 40/246* (2013.01); *H04W 84/12* (2013.01)

(58) Field of Classification Search
CPC ... H04W 40/02; H04W 40/246; H04W 84/12; H04W 40/12; H04W 40/16; H04L 41/12; H04L 5/003
See application file for complete search history.

(56) References Cited

U.S. PATENT DOCUMENTS 11,202,243 B2 * 12/2021 Dash .................... H04W 40/02
2004/0022224 A1 * 2/2004 Billhartz ............... H04W 40/02
370/400

(Continued)

FOREIGN PATENT DOCUMENTS

EP 1376939 A2 1/2004
EP 2924888 A1 * 9/2015 ........... H04B 7/0617

(Continued)

OTHER PUBLICATIONS

Office Action for Taiwan Application No. 108139960, mailed Aug. 28, 2023, 7 Pages.

(Continued)

*Primary Examiner* — Marisol Figueroa
(74) *Attorney, Agent, or Firm* — Buchalter; Jason W. Croft

(57) ABSTRACT

Methods and systems describe herein relate to a reconfigurable multi-radio bridge that may connect a local area network (LAN) with an access point (AP) or other WAP to the backhaul and may dynamically change and/or select transmission methods. An example implementation of a reconfigurable multi-radio bridge performs a method including discovering a topology of a network that includes one or more wireless stations (STAs), evaluating a metric for each of at least two routes discovered in the topology, receiving a packet that identifies a first STA of the one or more STAs as an intended destination of the packet, selecting a route of the at least two routes over which to send the packet based on the metric, and sending the packet from a reconfigurable multi-radio bridge over the selected route toward the first STA.

20 Claims, 12 Drawing Sheets

Related U.S. Application Data

(60) Provisional application No. 62/756,008, filed on Nov. 5, 2018.

(56) References Cited

U.S. PATENT DOCUMENTS

| | | |
|---|---|---|
| 2004/0192219 A1 | 9/2004 | Malone |
| 2005/0053003 A1* | 3/2005 | Cain .................. H04L 45/16 370/235 |
| 2008/0279101 A1 | 11/2008 | Wu et al. |
| 2009/0154390 A1 | 6/2009 | King |
| 2014/0269691 A1 | 9/2014 | Xue et al. |
| 2016/0081139 A1 | 3/2016 | Akhavan-Saraf et al. |
| 2016/0174293 A1 | 6/2016 | Mow et al. |
| 2020/0145895 A1 | 5/2020 | Dash et al. |

FOREIGN PATENT DOCUMENTS

| | | | | |
|---|---|---|---|---|
| WO | WO-2011005533 A2 * | 1/2011 | .......... | H04B 7/0413 |
| WO | WO-2018038648 A1 * | 3/2018 | .......... | H04B 7/0617 |

OTHER PUBLICATIONS

Extended European Search Report for counterpart EP Application No. 19207175.1, mailed Mar. 9, 2020, 3 pages.

* cited by examiner

RECONFIGURABLE MULTI-RADIO BRIDGE

CROSS-REFERENCE TO RELATED APPLICATION

This patent application is a continuation of U.S. application Ser. No. 16/671,149 filed on Oct. 31, 2019, which claims the benefit of prior filed U.S. Provisional Application No. 62/756,008 filed on Nov. 5, 2018, each of which are incorporated herein by reference in their entireties.

FIELD

The implementations discussed herein are related to a reconfigurable multi-radio bridge.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a communication channel(s) for the associated local network, access to the shared communication channel(s) relies on a multiple access methodology identified as Collision Sense Multiple Access (CSMA). CSMA is a distributed random access methodology for sharing a single communication medium, by having a contending communication link back off and retry access if a prospective collision on the wireless medium is detected, i.e. if the wireless medium is in use.

WAPs connect to a core or backbone network through a backhaul network or link. Some backhaul links are wired. When backhaul technology changes, hardware in the WAPs that connects to wired backhauls may have to be changed, which may increase costs and/or downtime in a network. Traditional network devices fail to effectively manage LAN communications for wireless stations with multiple connection routes.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to a reconfigurable multi-radio bridge. An example implementation of a reconfigurable multi-radio bridge performing a method includes discovering a topology of a network that includes one or more wireless stations (STAs); evaluating a metric for each of at least two routes discovered in the topology; receiving a packet that identifies a first STA of the one or more STAs as an intended destination of the packet; selecting a route of the at least two routes over which to send the packet based on the metric, each of the at least two routes reaching the first STA; and sending the packet from a reconfigurable multi-radio bridge over the selected route toward the first STA.

In an example systems, a reconfigurable multi-radio bridge can include memory and a processor operatively coupled to the memory, where the processor configured to discover a topology of a network that includes one or more wireless stations (STAs); evaluate a metric for each of at least two routes discovered in the topology; receive a packet that identifies a first STA of the one or more STAs as an intended destination of the packet; select a route of the at least two routes over which to send the packet based on the metric, each of the at least two routes reaching the first STA; and send the packet from a reconfigurable multi-radio bridge over the selected route toward the first STA.

In an example implementation, a non-transitory computer readable medium, comprising instructions that when execute by a processor, the instructions to discover a topology of a network that includes one or more wireless stations (STAs); evaluate a metric for each of at least two routes discovered in the topology; receive a packet that identifies a first STA of the one or more STAs as an intended destination of the packet; selecting a route of the at least two routes over which to send the packet based on the metric, each of the at least two routes reaching the first STA; and send the packet from a reconfigurable multi-radio bridge over the selected route toward the first STA.

In an example implementation, the network can include an access point the reconfigurable multi-radio bridge evaluates metrics for each of multiple routes, compare different metrics, and determine a preferred link based on one or more of the metrics or an aggregation. An example method can include determining a total duration to send the packet from the reconfigurable multi-radio bridge to the AP and from the AP to the first STA, reserving a transmit opportunity (TXOP) equal to the total duration. Then sending the packet from the reconfigurable multi-radio bridge over the selected route toward the first STA can be done by sending the packet from the reconfigurable multi-radio bridge to the AP during a first portion of the reserved TXOP, and the AP sends the packet to the first STA during a remainder portion of the reserved TXOP.

In another example implementation, a reconfigurable multi-radio bridge that includes a first reconfigurable radio with a first transmit/receive (TX/RX) channel and a second TX/RX channel and a second reconfigurable radio with a third TX/RX channel and a fourth TX/RX channel. The first reconfigurable radio can be configured to selectively transmit and receive data on the first TX/RX channel or the second TX/RX channel, and the second reconfigurable radio can be configured to selectively transmit and receive data on the third TX/RX channel or the fourth TX/RX channel.

Additional features and advantages of the invention will be set forth in the description H which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only typical implementations of the invention and are therefore not to be considered limiting of its scope. The invention will be described and explained with additional specificity and detail through the use of the accompanying drawings in which.

DETAILED DESCRIPTION OF SOME EXAMPLE IMPLEMENTATIONS

Figure 1:
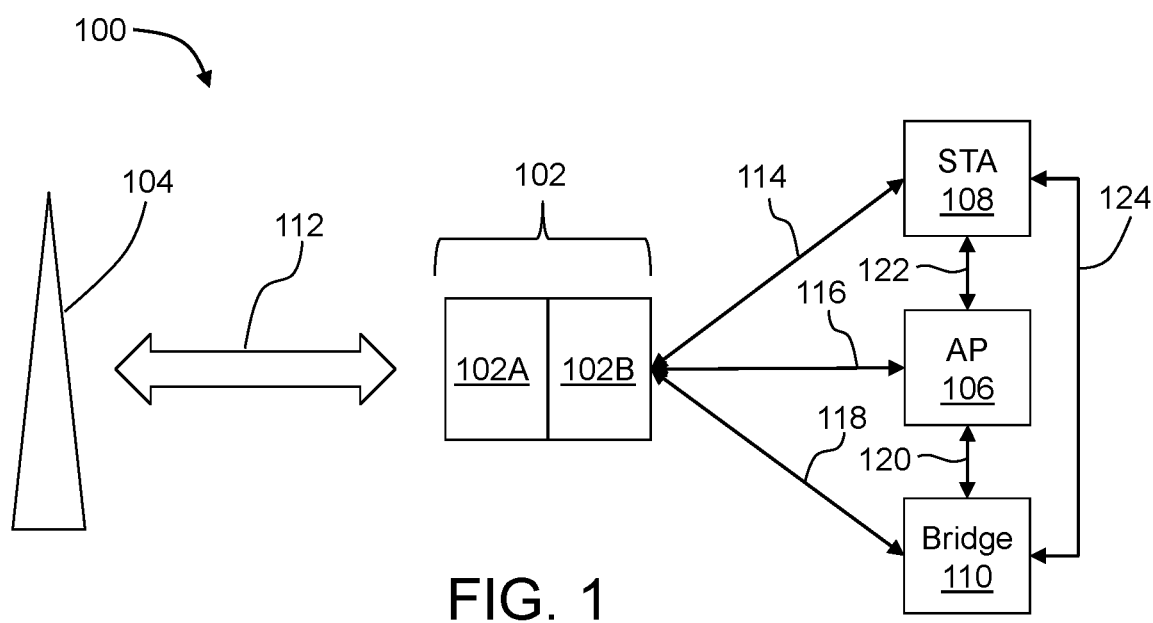
FIG. 1 illustrates an example operating environment in which a reconfigurable multi-radio bridge may be implemented.

Implementations described herein include a reconfigurable multi-radio bridge that may connect a local area network (LAN) with an access point (AP) or other WAP to the backhaul and may dynamically change and/or select the transmission method, e.g., link selection, collaborative transmission, distributed multiple-input and multiple output (MIMO) transmission, network allocation vector (NAV) sharing, and/or others, based on automatic topology detection and/or state metrics such as traffic, load, delay, throughput, and/or other state metrics. In these and other implementations, the reconfigurable multi-radio bridge controller may bridge a backhaul network to an AP, may serve as an AP for one or more wireless stations (STAs), may be a dedicated relay in the backhaul network, and/or may provide other features or functionality as described herein.

Traditional network management approaches fail to effectively manage LAN communications for network device with multiple changing connection routes. A typical LAN may connect to a fixed WAP and direct traffic based on a fixed topology or default path assumptions. However, traditional LAN management approaches fail to maximize routing of network communications in consideration of changing connection permutations and in the presence of devices that can adaptively change roles.

With the growing complexity of network configurations and the variety and number of nodes on a wireless network, there is increasing need for improved dynamic traffic management that can efficiently coordinate communication services with different routing options to number of devices. Aspects of example implementations described herein relate to systems and methods for improving network management with a multi-bridge controller that evaluates routing options for a LAN with a variety of network devices.

In an example aspect of the present disclosure, a multi-radio bridge controller intelligently selects network segments or routes for communications with network devices of a LAN. The multi-radio bridge controller can configure network communications to utilize different dimensions of a selected network segment for a station such as retransmission route, MU behavior, nulling, channel management, bandwidth allocation, etc. For example, the multi-radio bridge controller can coordinate with network devices to send traffic to a station on a selected route as well as on a specifically selected channel.

The multi-radio bridge controller can operate with various network management devices with downstream routing capabilities, for example, mesh nodes, switches, repeaters, extenders, etc. In an example aspect, the multi-radio bridge controller manages communication with a station to and from the backhaul connection and/or within the LAN by identifying multiple routes available for communication with the station, evaluating metrics associated with each route, selecting one or more of the routes based on the metrics, and re-routing network packets to the station via the selected route. The controller can update communications routes and/or links to enable the station to avoid a link type, instruct network devices with downstream routing capabilities, re-configuring network resources (e.g., buffering, reserving a channel, etc.).

In an example, the LAN may include multiple access points (e.g., gateway, mesh nodes, repeater, etc.) and a station that is capable of connecting to an access point directly and/or through one or more intermediate nodes. In an example, the multi-radio bridge controller can employ precoding and coordinate access points to form a distributed MIMO transmitter. The multi-radio bridge controller can enable more communication options by coordinating or configuring training behavior of a selected network segment. The multi-radio bridge controller enables dynamic optimal route selection bases on metrics for the station, the possible routes, and/or other aggregate metrics of the network communications. For example, the multi-radio bridge controller can base its decision on a combination of channel state information, link quality, delay time, number of hops, jitter, and/or other metrics. As the network traffic, station behavior, and/or LAN performance changes, the multi-radio bridge re-evaluates the metrics to determine whether to select a different route for the communicating with station.

In another example implementation, the multi-radio bridge controller can direct stations to the backhaul and avoid connection to the WAP. In an example, a station may be able to connect to WAP and the backhaul connection where connection to the backhaul can require a specific authorization, credentials, or account (e.g., cellular service). In this example, the multi-radio bridge controller can identify station capabilities, confirm direct backhaul authorization for the STA, and determine to avoid or deny WAP connection for the STA to connect with the backhaul. For example, a multi-radio bridge controller can determine to route a backhaul credentialed STA to directly connect with the backhaul network by avoiding or denying the WAP connection based backhaul connection strength, LAN performance, STA request type, etc.

Further, the multi-radio bridge controller can improve overall LAN performance and error handling. In an example aspect, the multi-radio bridge controller can be configured to manage communications with multiple network devices to optimize the LAN performance. In an example, the multi-radio bridge controller can configure default routes for certain types of network devices or traffic, sample network performance metrics, evaluate the metrics, and update the routes to optimize types of network devices, prioritize traffic, improve overall performance, etc. For example, a main transmission may be sent over one route, such from a bridge to a first AP then to station, and the multi-radio bridge controller can direct retransmissions to be sent over a different route, such as from a bridge directly to the station or through a different intermediary node.

Moreover, the multi-radio bridge controller can intelligently select network segments or routes for communications with network devices with predictive calculations or triggers (e.g., heuristics, thresholds, error detection, intrusion detection, etc.). In some implementations the multi-radio bridge controller can be operatively connected to a remote analytics and storage resources.

In an example implementation, the multi-radio bridge controller operates in a fixed wireless network that to connect multiple locations wirelessly and manages communications with network devices capable of one or more different connection types such as wired, wireless, cellular, laser, mm Wave, Bluetooth, etc. In an example, a residential LAN can connect with a mmWave backhaul to a fixed cellular tower and the multi-radio bridge operates to intelligently control stations associated with the residential LAN to optimize communication performance a particular station and/or the LAN. For example, the multi-radio bridge controller can direct wireless communications to a mobile device through an intermediary node based on proximity, re-direct wireless communications directly to the mobile device based on priority traffic (e.g., teleconference video), and/or disconnect the mobile device from the LAN to enable cellular communication as it leaves coverage of the LAN (e.g., when the load on the LAN increases).

In another example implementation, the multi-radio bridge controller can intelligently select network segments or routes for communications with network devices based on classification or tagging of links. For example, the multi-radio bridge controller can detect a type of traffic (e.g., streaming video, edge IoT, etc.) to or from a STA, and classify or tag the STA for a performance level or prioritization (e.g., high quality of service, scheduled, etc.) and reconfigure the link for the STA based on the traffic type and or prioritization in addition to or independent of metrics.

Reference will now be made to the drawings to describe various aspects of example implementations of the invention. It is to be understood that the drawings are diagrammatic and schematic representations of such example implementations, and are not limiting of the present invention, nor are they necessarily drawn to scale.

FIG. 1 illustrates an example operating environment 100 in which a reconfigurable multi-radio bridge 102 ("bridge 102") may be implemented, arranged in accordance with at least one implementation described herein. The environment 100 additionally includes a base station 104. The environment 100 may further include a LAN that includes one or more APs 106 and/or one or more STAs 108, and/or the environment may further include one or more other reconfigurable multi-radio bridges 110 ("bridge 110").

The base station 104 may generally include a transceiver configured to wirelessly connect one or more devices, such as the bridges 102, 110, the AP 106, and/or the STA 108, to a network, such as a core network and/or a backbone network. The base station 104 may provide a backhaul link 112 to the other devices. The base station 104 may include a base transceiver station (BTS), an eNodeB, a Node B, a cell tower, such as a super cell tower, a macro cell tower, or a micro cell tower, and/or the base station 104 may include other suitable hardware to connect wireless devices to the network.

The bridge 102 may include a first reconfigurable radio 102A and a second reconfigurable radio 102B. The first reconfigurable radio 102A may include two or more different transmit/receive (TX/RX) channels. Similarly, the second reconfigurable radio 102B may include two or more different TX/RX channels. Thus, the bridge 102 may include four or more TX/RX channels. The first reconfigurable radio 102A and the second reconfigurable radio 102B can be transmit/receive on the same or different carrier frequencies. For example, the first reconfigurable radio 102A can be cellular, mmWave, television white band spaces, etc. and the second reconfigurable radio 102B can be at 2.4 GHz, 5 GHz, 6 GHz, etc. In another example, the first reconfigurable radio 102A and the second reconfigurable radio 102B can both be operating on the same carrier frequency (e.g., cellular, mmWave, television white band spaces, 2.4 GHz, 5 GHz, 6 GHz, etc.).

Each of the TX/RX channels may be arranged to communicate at any suitable desired frequency and/or frequency band, but in at least one implementation is arranged to communicate using centimeter (cm) wave, millimeter (mm) wave, or microwave frequency wireless signals. For example, each of the TX/RX channels of the bridge 102 may operate in a cm wave band such as the 2.4 gigahertz (GHz) band, the 5 GHz band, or the 6 GHz band; a microwave frequency band such as the 28 GHz band; or a mm wave band such as the 60 GHz band. In an implementation, at least one of the TX/RX channels of the first reconfigurable radio 102A may communicate in the 6 GHz band, the 28 GHz band, or the 60 GHz band with the base station 104 over the backhaul link 112. In an implementation, at least one of the TX/RX channels of the second reconfigurable radio 102B may communicate in the 2.4 GHz band or the 5 GHz band with the AP 106 over a link 114, with the STA 108 over a link 116, and/or with the bridge 110 over a link 118. Alternatively or additionally, at least one of the TX/RX channels of the second reconfigurable radio 102B may communicate in the 6 GHz band, the 28 GHz band, or the 60 GHz band with the bridge 110 over the link 118. Each TX/RX channel of the bridge 102 may operate in accordance with a corresponding standard, e.g., any of the IEEE 802.11 standards or other standards.

The bridge 110 may be configured in the same or similar manner as the bridge 102. The bridge 110 may connect to the core network via the link 118, the bridge 102, the backhaul link 112, and the base station 104.

The AP 106 may include a gateway, a repeater, a mesh node, and/or other suitable access point for wireless stations or devices such as the STA 108. The AP 106 may connect to the core network via the link 116, the bridge 102, the backhaul link 112, and the base station 104. In some implementations, the AP 106 may further connect to the core network via the bridge 110 and a link 120.

The STA 108 may generally include any device that has the capability to wirelessly connect to the AP 106, the bridge 102, and/or the bridge 110, e.g., according to any of the 802.11 standards or other suitable wireless standard. The STA 108 may include a desktop computer, a laptop computer, a tablet computer, mobile phone, a smartphone, a personal digital assistant (PDA), a smart television, or any other suitable wireless station. In an example implementation, the STA 108 may connect to the core network via a link 122, the AP 106, the link 116, the bridge 102, the backhaul link 112, and the base station 104. In another example implementation, the STA 108 may connect to the core network via a link 124, the bridge 110, the link 118, the bridge 102, the backhaul link 112, and the base station 104. In another example implementation, the STA 108 may bypass the AP 106 and the bridge 110 and may connect to the core network via the link 114, the bridge 102, the backhaul link 112, and the base station 104.

The bridge 102 may facilitate one or more of a variety of transmission methods mentioned briefly here followed by further descriptions elsewhere, e.g., with respect to FIGS. 5-13B. The bridge 102 can control transmission methods using different implementations such as employing logic added to and/or incorporated as part of local network device of the LAN, e.g., as described with respect to FIGS. 2-4. In some examples, the bridge 102 can include a local LAN multi-radio bridge controller agent operatively connected with virtual or remote processing resources (e.g., cloud computing) to perform operations described herein. Example aspects of the present disclosure improve LAN performance, network efficiency, signal coverage, and error handling with multiple different types of access points and changing connection permutations.

In an implementation, the bridge 102 may be an AP for one or more STAs such as the STA 108. The AP 106 may be altogether absent in this implementation or the STA 108 may have a better link to the bridge 102 than to the AP 106. One or more other STAs may have a preferred link to the AP 106 than to the bridge 102 and may directly access (e.g., without one or more intermediary nodes) the AP 106 rather than the bridge 102, where the AP 106 in turn accesses the core network through, e.g., the bridge 102, the backhaul link 112, and the base station 104.

In another implementation, the LAN may include two or more APs 106 such as a gateway and a repeater and one or more STAs 108. The STAs 108 may connect to the bridge 102 directly and/or through one or both of the repeater and the gateway. Based on one or more metrics for each of multiple routes to each of the STAs 108, traffic (e.g., packets) for each STA 108 may be sent to the corresponding STA 108 over an optimal route, e.g., a route to the corresponding STA 108 that has or results in a better metric or better aggregate metrics compared to another route to the corresponding STA 108. The one or more metrics may include link quality, delay, number of hops, jitter, and/or other metrics. The metric(s) may change over time and traffic may be switched accordingly.

In another implementation, the LAN may include two or more STAs 108 where a first STA 108 connects directly to the bridge 102 and a second STA 108 connects directly to the AP 106. One or both of the bridge 102 and the AP 106 may provide active interference nulling for simultaneous transmission of different packets from the bridge 102 to the first STA 108 and from the AP 106 to the second STA 108. For example, the bridge 102 and the AP 106 may coordinate to effect simultaneous transmission of a first packet from the bridge 102 to the first STA 108, a second packet from the AP 106 to the second STA 108, and at least one of: a nulling signal from the AP 106 to the first STA 108 or a nulling signal from the bridge 102 to the second STA 108.

In another implementation, the bridge 102 and the AP 106 may form a distributed MIMO transmitter to send traffic to the STA 108. For example, the bridge 102 and the AP 106 may coordinate to effect simultaneous transmission of a packet from the AP 106 directly to the STA 108 and from the bridge 102 directly to the STA 108. In this and other implementations, the bridge 102 and AP 106 may use different precoders when operating independently than when coordinating as a distributed MIMO transmitter.

In one or more of the above implementations, traffic may be transmitted from the bridge 102 to the STA 108 directly or through the AP 106 where the particular route (e.g., direct or through the AP 106) may depend on, e.g., channel conditions of each of the routes. Alternatively, different traffic with at least one nulling signal may be simultaneously transmitted from the bridge 102 and the AP 106 to two STAs 108 and/or traffic may be transmitted to the STA 108 simultaneously from both the bridge 102 and the AP 106. In another implementation, main transmissions may be sent over one route, such from the bridge 102 to the AP 106 to the STA 108, while any retransmission may be sent over another route, such as from the bridge 102 directly to the STA 108.

In another implementation, the bridge 102 may improve coverage for STAs 108 that have associated with the AP 106 in the past and move to locations with inadequate coverage from the AP 106 that have adequate coverage from the bridge 102. In this and other implementations, the bridge 102 may periodically or in response to a trigger replicate a basic service set (BSS) of the AP 106. If link setup occurs, e.g., if the STA 108 sends an association request to the bridge 102, the bridge may maintain the BSS and establish a link directly between the STA 108 and the bridge 102 to send traffic to the STA 108 while bypassing the AP 106.

In another implementation, the bridge 102 may extend the backhaul link 112 to the bridge 110. For example, if the bridge 110 is shadowed from the base station 104 or otherwise lacks adequate coverage from the base station 104, the bridge 102 may extend the backhaul link 112 to the bridge 110, in which case the link 118 may be referred to as a backhaul relay link 118. In this implementation, the first reconfigurable radio 102A and the second reconfigurable radio 102B may be configured to operate at the same frequency and/or frequency band. Alternatively, the bridge 102 may adaptively reconfigure itself, e.g., the second reconfigurable radio 102B, to selectively provide a WAP link 118 to the bridge 110 and a backhaul relay link 118 to the bridge 110.

In the above and/or other implementations, a determination of which of multiple particular transmission methods to use may be made individually by the bridge 102, individually by the AP 106, or jointly by the bridge 102 and the AP 106. Joint determinations may be made at setup time and may include a setup time handshake. Alternatively or additionally, joint determinations may specify a trigger that, when detected, causes the bridge 102 and/or the AP 106 to adaptively change or select the corresponding transmission method.

For example, the multi-radio bridge controller can make a joint determination with a mesh AP. The mesh AP can inform the multi-radio bridge about the traffic characteristics (e.g., amount of traffic, number of hops, link quality, channel characteristics, etc.). The multi-radio bridge can perform packet inspection to deduce one or more of the traffic characteristics. In another example employing a mesh AP, more accurate traffic characteristics can be provided to the multi-radio bridge in a more efficient manner directly via the mesh AP rather than measuring from direct packet inspection. In response to traffic characteristics from the mesh AP, the multi-radio bridge can select the correct routing of the packet.

Figure 2:
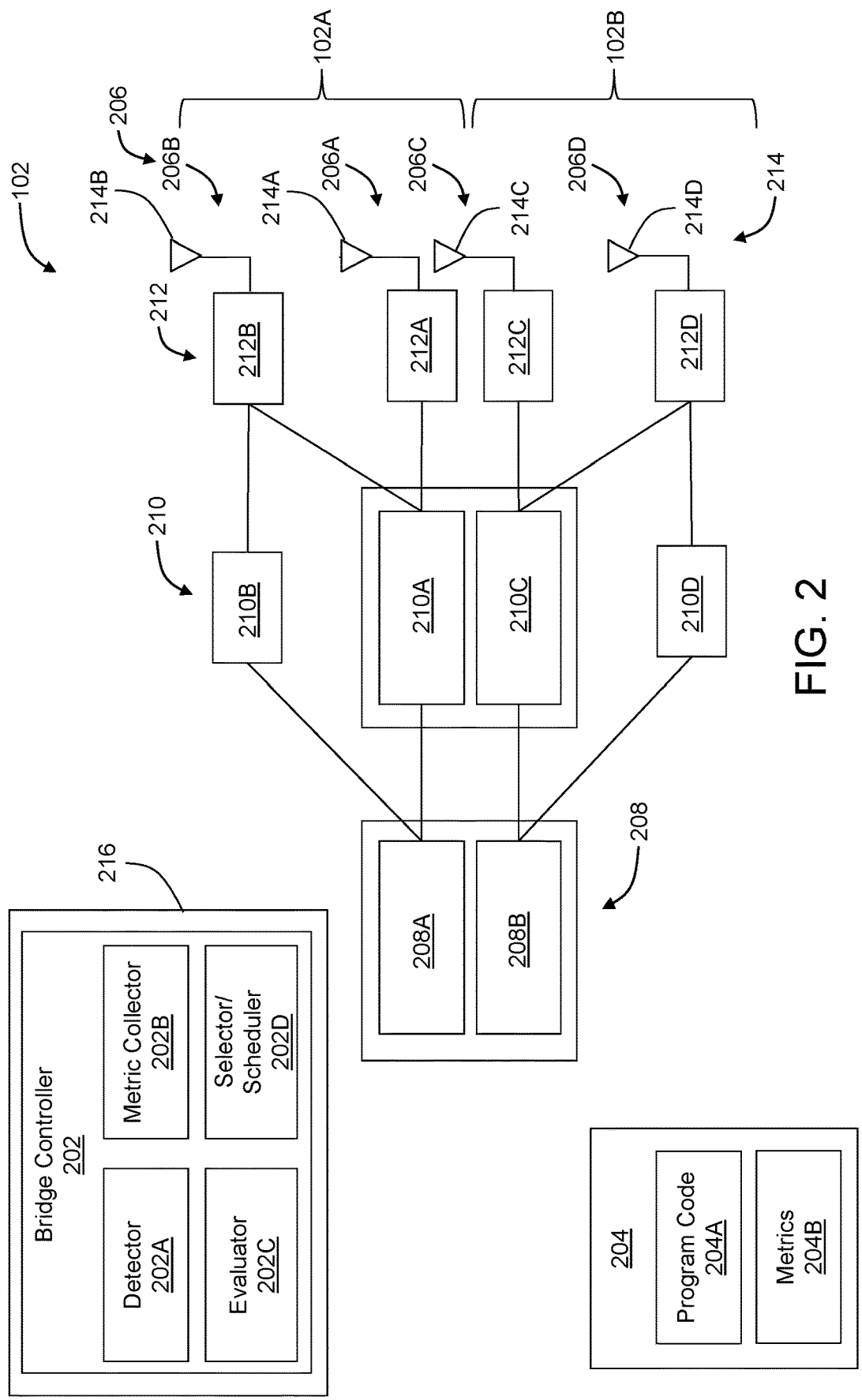
FIG. 2 illustrates an example of the reconfigurable multi-radio bridge of FIG. 1.

FIG. 2 illustrates an example of the bridge 102 of FIG. 1, arranged in accordance with at least one implementation described herein. As illustrated, the bridge 102 includes the first reconfigurable radio 102A and the second reconfigurable radio 102B and may further include a bridge controller 202 and a non-volatile memory 204 or other computer-readable storage medium.

The first reconfigurable radio 102A may include a first TX/RX channel 206A and a second TX/RX channel 206B. The second reconfigurable radio 102B may similarly include a first TX/RX channel 206C and a second TX/RX channel 206D. Each of the TX/RX channels 206A, 206B, 206C, 206D (collectively "TX/RX channels 206") may generally be configured to transmit data to and/or receive data from other nodes. The term node may broadly include any wireless communication node, such as a base station, an AP, a STA, another reconfigurable multi-radio bridge, or other node capable of wireless communication.

Each of the TX/RX channels 206 may include a baseband (BB) circuit, a radio frequency (RF) circuit, a front end module (FEM), and an antenna or antenna array. In more detail, the first TX/RX channel 206A of the first reconfigurable radio 102A may include a first BB circuit 208A, a first RF circuit 210A, a first FEM 212A, and a first antenna 214A. The second TX/RX channel 206B of the first reconfigurable radio 102A may include the first BB circuit 208A, a second FEM 212B, and a second antenna 214B. The second TX/RX channel 206B of the first reconfigurable radio 102A may further include the first RF circuit 210A or a second RF circuit 210B.

Analogously, the first TX/RX channel 206C of the second reconfigurable radio 102B may include a second BB circuit 208B, a third RF circuit 210C, a third FEM 212C, and a third antenna 214C. The second TX/RX channel 206D of the second reconfigurable radio 102B may include the second BB circuit 208B, a fourth FEM 212D, and a fourth antenna 214D. The second TX/RX channel 206D of the second reconfigurable radio 102B may further include the third RF circuit 210C or a fourth RF circuit 210D.

Each of the first and second reconfigurable radios 102A, 102B is illustrated in Figure as including two TX/RX channels. More generally, each of the first and second reconfigurable radios 102A, 102B may include two or more TX/RX channels.

The first reconfigurable radio 102A is configured to selectively transmit and receive data on the first TX/RX channel 206A or the second TX/RX channel 206B. Each of the first TX/RX channel 206A and the second TX/RX channel 206B may operate at a different frequency and/or frequency band than the other. For example, the first TX/RX channel 206A may be used for a backhaul link, e.g., at the 28 GHz frequency band, while the second TX/RX channel 206B may be used for a WAP link, e.g., at the 5 GHz frequency band.

Analogously, the second reconfigurable radio 102B is configured to selectively transmit and receive data on the first TX/RX channel 206C or the second TX/RX channel 206D. Each of the first TX/RX channel 206C and the second TX/RX channel 206D may operate at a different frequency and/or frequency band than the other. For example, the first TX/RX channel 206C may be used for a backhaul link, e.g., at the 28 GHz frequency band, while the second TX/RX channel 206D may be used for a WAP link, e.g., at the 5 GHz frequency band.

The TX/RX channels 206A, 206B, 206C, 206D may be collectively referred to as TX/RX channels 206. The BB circuits 208A, 208B may be collectively referred to as BB circuits 208. The RF circuits 210A, 210B, 210C, 210D may be collectively referred to as RF circuits 210. The FEMs 212A, 212B, 212C, 212D may be collectively referred to as FEMs 212. The antennas 214A, 214B, 214C, 214D may be collectively referred to as antennas 214.

In each of the BB circuits 208, wireless communications transmitted to or received from each node that communicates with the bridge 102 may be processed. Each of the BB circuits 208 may support single and/or multi-user communications with the nodes. Each of the BB circuits 208 may include one or more equalizers, one or more automatic gain controllers, one or more encoders (e.g., a forward error correction (FEC) encoder), one or more decoders (e.g., a FEC decoder), one or more bit interleavers, one or more constellation mappers, one or more precoders, one or more bit deinterleavers, one or more constellation demappers, and/or other suitable circuit elements.

Each of the RF circuits 210 may upconvert wireless transmissions initiated in the corresponding BB circuit 208. Each of the RF circuits 210 may also downconvert incoming transmissions received on the corresponding antenna 214 and may pass them for further processing to the corresponding BB circuit 208. Each of the RF circuits 210 may include one or more analog-to-digital converters (ADCs), one or more digital-to-analog converters (DACs), one or more RF filters, one or more upconverters, one or more downconverters, and/or other suitable circuit elements.

Each of the FEMs 212 may include one or more analog circuit elements to process RF transmissions outbound from the corresponding RF circuit 210 or RF transmissions inbound to the corresponding RF circuit 210. Each FEM 212 may include one or more phase controllers, one or more RF controllers, one or more mixers, one or more gain elements such as one or more low noise amplifiers (LNAs), and/or other suitable circuit elements.

Each of the antennas 214 may include a single antenna with one or more sectors, or multiple antennas each with one or more sectors. One or more of the antennas 214 may be steerable.

In an example implementation, the bridge controller 202 may be instantiated by a processor circuit 216 executing program code 204A stored on the non-volatile memory 204. The bridge controller 202 may generally be configured to control the configuration of each of the first and second reconfigurable radios 102A, 102B and to adaptively change or select a transmission method of the bridge 102. The bridge controller 202 may include a detector 202A, a metric collector 202B, an evaluator 202C, and a selector/scheduler 202D. Topology can include, but is not limited to, detection of network segments within the LAN as well as connection capabilities of stations independent of the LAN. For example, detector 202A can determine radio characteristics and transmission capabilities of each station. In an example implementation, detector 202A can determine a mobile computing device is connected to the LAN via an ethernet cable but also has Wi-Fi, Bluetooth, satellite, cellular, etc. capabilities. For example, detector 202A may detect node capabilities through protocol discovery features, request nodes report communication capabilities, and/or maintain an inventory of devices associated with the network. The detector 202A may detect a node is capable of connecting to the LAN simultaneously with a wired and wireless connection.

In an example implementation, one or more of the RF circuits 210A-D may convert their carrier frequency and BB data into an intermediate frequency. For example, the RF circuits 210A-D may convert for implementing more efficient filters or other RF components than filtering or similar activities on the carrier frequency.

In an example implementation, the example RF circuits 210A-D can include mixer and local oscillator to perform intermediate frequency shifting (not shown). For example, since when any of the involved frequencies in the RF circuits 210A-D are close to each other (e.g., close enough frequencies that can cause signal leakage), the mixer and local oscillator can shift one or more of the intermediate frequencies to another range (e.g., a symbiotic frequency) to reduce or prevent leakage. For example, the conversion can happen inside the RF circuit 210C or a dedicated component such as RF circuit 210D. In an example, the input to the RF components can come from separate BB components. The RF may also include additional shielding units to further reduce or prevent leakage.

In an example where the RF circuit 210A is operating at 5 GHz and the RF circuit 210C is operating at 28 GHz with an intermediate frequency at 5 GHz there is a potential for leakage of signal between the RF circuit 210A and the RF circuit 210C due to the common frequency. The RF circuit 210C can shift the intermediate frequency at 5 GHz to 5.4 GHz to reduce or prevent the leakage with the RF circuit 210A operating at 5 GHz.

Figure 3:
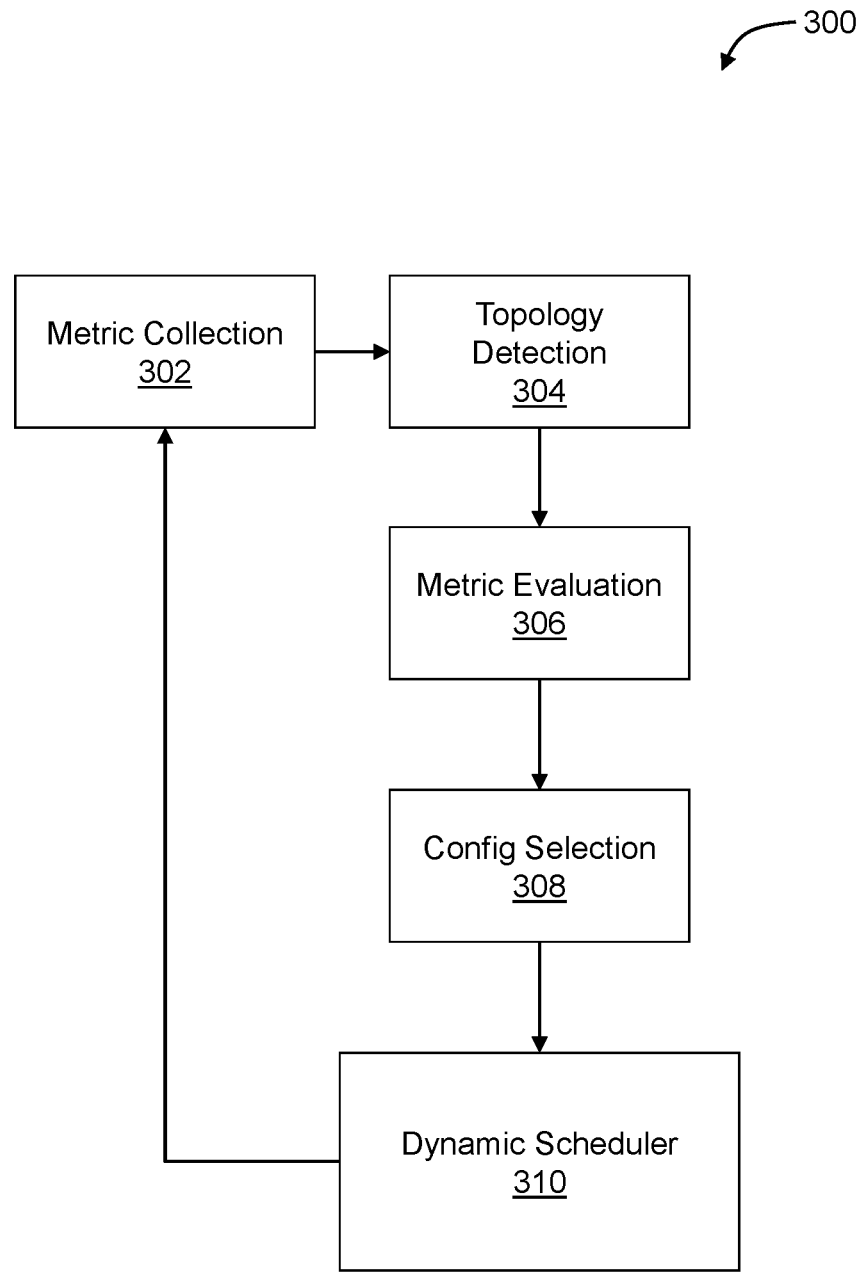
FIG. 3 is a flowchart of an example method of adaptive transmission control.

FIG. 3 is a flowchart of an example method 300 of adaptive transmission control, arranged in accordance with at least one implementation described herein. The method 300 may be implemented, in whole or in part, by one or more of the bridge 102, the bridge 110, and/or the AP 106. Alternatively or additionally, execution of the bridge controller 202 by the processor device 216 may cause the processor device 216 to perform or control performance of one or more of the operations or blocks of the method 300.

The method 300 may include one or more of blocks 302, 304, 306, 308, and/or 310. In more detail, the method 300 may include metric collection at block 302, topology detection at block 304, metric evaluation at block 306, config selection at block 308, and dynamic scheduling at block 310. An example implementation of the method 300 by the bridge controller 202 will be discussed with combined reference to FIGS. 2 and 3.

According to an example implementation, at block 304 the detector 202A discovers a topology of a network that includes one or more STAs and/or other nodes. The detector 202A, alone or together with an AP in the network, may use regular data transmission and sniffing to discover the network topology and/or may discover the network topology in any other suitable manner. The detector 202A can detect changes in the network topology (e.g., added or unavailable access points). For example, detector 202A may periodically scan the network or repeat scanning in response to error message.

At block 302, the metric collector 202B may collect one or more metrics of the network, which may include collecting one or more metrics for one or more routes and/or nodes in the network. The metrics may be stored in the non-volatile memory 204 or a remote repository. For example, the metrics may include, e.g., channel state information (CSI), received signal strength indicator (RSSI), other measure of link quality, delay, number of hops, jitter, modulation and coding scheme (MCS), clear channel assessment (CCA) level, interference, estimated throughput, airtime, load on the bridge 102 and/or AP, traffic priority, route congestion, and/or other suitable metrics.

Some metrics may change over time and the metric collector 202B may periodically recollect such metrics at block 302 and update the metrics 204B in the non-volatile memory 204. Some metrics may be static or relatively static over time and may be saved longer term locally at the bridge 102 and/or remotely. The static or relatively static metrics may not be recollected at all, may be recollected with less frequency than the more variable metrics, or recollected in response to a trigger (e.g., performance threshold, network device change, error handling, etc.). Metric collector 202B can further maintain models of metrics, aggregate statistics, and generate predictive calculations to support the functions of the bridge controller 202.

At block 306, the evaluator 202C may evaluate the collected metrics in view of the discovered network topology and determine which of multiple routes and/or nodes has a better metric or metrics in comparison to other routes and/or nodes. The evaluator 202C may also initiate training and/or may assign route weights to various routes based on the evaluated metrics to determine a preferred route and/or node. For an example station, a route through the closest access point may have a better delay metric than a different access point, but the evaluator 202C can determine a higher error metric for that example station with the closest access point and select and weight the route with the different access point as preferred. The metrics and/or route weights may be saved in lookup tables in the non-volatile memory 204 or other location.

At block 308, the selector/scheduler 202D may select a particular route and/or transmission method for sending traffic to a corresponding STA. The selector/scheduler 202D may also select applicable training and/or precoding for the selected route and/or transmission method which may be shared with other nodes in the network, such as with the AP. The selector/scheduler 202D or other portion of the bridge controller 202 may periodically populate the lookup tables with appropriate values corresponding to the selected route, transmission method, training, and/or precoding. The selected route, transmission method, training, and/or precoding may be fixed or adaptive (e.g., in response to changing metrics and/or topology).

At block 310, the selector/scheduler 202D may schedule packets for delivery to the STA over the selected route and/or using the selected transmission method. If the bridge 102 is operating in an adaptive manner, the selector/scheduler 202 may adaptively or dynamically switch traffic (e.g., to a different route and/or to a different transmission method) in response to changing metrics and/or topology.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

Figure 4:
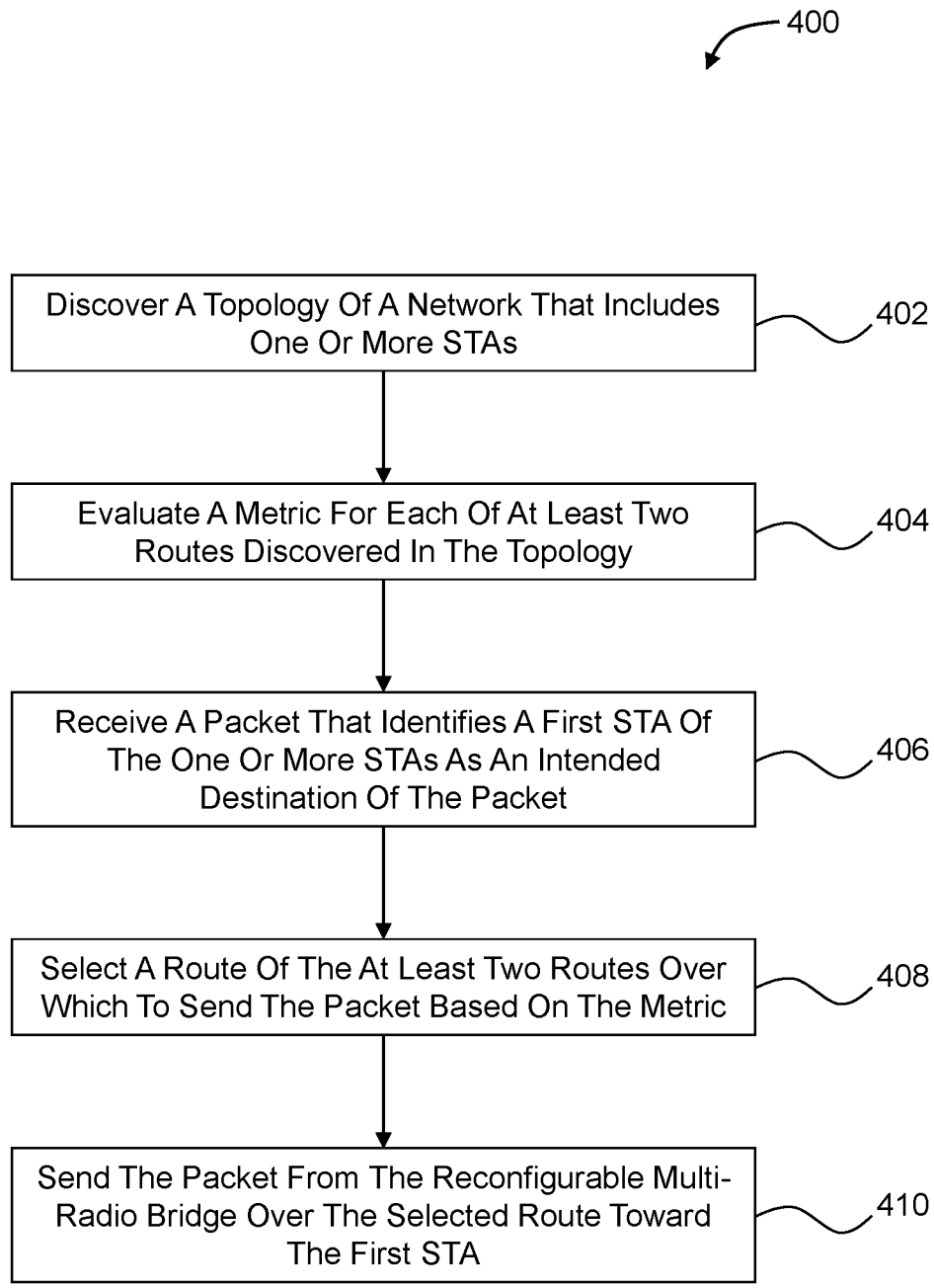
FIG. 4 is a flowchart of another example method of adaptive transmission control.

FIG. 4 is a flowchart of another example method 400 of adaptive transmission control, arranged in accordance with at least one implementation described herein. The method 400 may be implemented, in whole or in part, by one or more of the bridge 102, the bridge 110, and/or the AP 106. Alternatively or additionally, execution of the bridge controller 202 by the processor device 216 may cause the processor device 216 to perform or control performance of one or more of the operations or blocks of the method 400.

At block 402, the method 400 may include discovering a topology of a network that includes one or more STAs and/or other nodes. For example, the network may also include one or more APs, another reconfigurable multi-radio bridge, and/or other nodes.

At block 404, the method 400 may include evaluating a metric for each of at least two nodes and/or routes discovered in the topology.

At block 406, the method 400 may include receiving a packet that identifies a first STA of the one or more STAs as an intended destination of the packet.

At block 408, the method 400 may include selecting a route of the at least two routes over which to send the packet based on the metric, each of the at least two routes reaching the first STA.

At block 410, the method 400 may include sending the packet from a reconfigurable multi-radio bridge, such as the bridge 102 of FIGS. 1 and 2, over the selected route toward the first STA.

In an implementation, the packet may be received in a first frequency band via a first reconfigurable radio of the reconfigurable multi-radio bridge. Alternatively or additionally, the packet may be sent in a second frequency band via a second reconfigurable radio of the reconfigurable multi-radio bridge. The first and second frequency bands may be the same or different.

In an implementation, the method 400 can include performing intermediate frequency shifting where receiving includes converting a carrier frequency into an intermediate frequency and sending includes converting a baseband signal into an intermediate frequency. Since the reconfigurable multi-radio bridge can have multiple radios operating at frequencies close to each other that can cause signal leakage, the reconfigurable multi-radio bridge can shift intermediate frequencies to another range to reduce or prevent signal leakage between the multiple radios.

Figure 5:
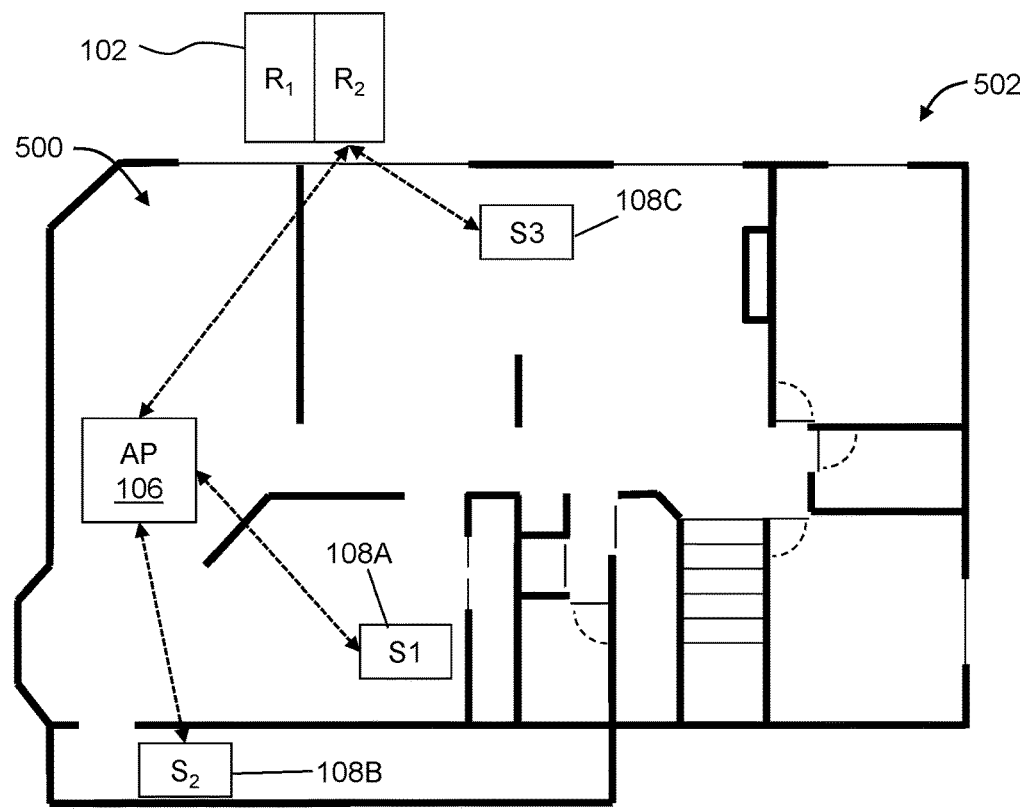
FIG. 5 illustrates a first example use case of the reconfigurable multi-radio bridge of FIG. 1.

FIG. 5 illustrates a first example use case of the bridge 102 of FIG. 1, arranged in accordance with at least one implementation described herein. FIG. 5 illustrates the bridge 102 and a LAN 500 at a house, building, or other location 502. The LAN 500 may include the AP 106, a first STA 108A, a second STA 108B, and a third STA 108C. In FIG. 5 and subsequent Figures, the first and second reconfigurable radios 102A, 102B of the bridge 102 are labeled, respectively, $R_1$ and $R_2$. In FIG. 5 and subsequent Figures, the first reconfigurable radio $R_1$ of the bridge 102 or of other reconfigurable multi-radio bridges herein may connect to a base station and/or backhaul (see backhaul link 112 in FIG. 1) or backhaul relay, while the second reconfigurable radio $R_2$ may connect to a LAN (e.g., the LAN 500 in FIG. 5), an AP, a STA, another bridge, or other network or node.

In FIG. 5, the first STA 108A and the second STA 108B may have a better direct link to the AP 106 than to the bridge 102. In comparison, the third STA 108C may have a better direct link to the bridge 102 than to the AP 106. Accordingly, traffic to the first STA 108A and the second STA 108B may be routed through the AP 106 rather than directly from the bridge 102 to the first STA 108A and the second STA 108B, while traffic to the third STA 108C may be routed directly from the bridge 102 to the third STA 108C. If the various link qualities change due to movement of the STAs 108A, 108B, 108C or for other reasons, the bridge 102 and/or the AP 106 may adaptively adjust traffic routes to the affected STAs 108A, 108B, 108C.

With combined reference to FIGS. 4 and 5, evaluating the metric for each of the at least two routes at block 404 may include determining link quality of a first link between the AP and the third STA 108C and of a second link between the bridge 102 and the third STA 108C and determining which of the first link and the second link has higher link quality. Selecting the route based on the metric at block 408 may include selecting the first link or the second link that has the higher link quality. If the first link is selected at block 408, sending the packet over the selected route at block 410 may include sending the packet from the bridge 102 to the AP 106 for the AP 106 to send to the third STA 108C. If the second link is selected at block 408, sending the packet over the selected route at block 410 may include sending the packet from the bridge 102 directly to the third STA 108C.

Figure 6:
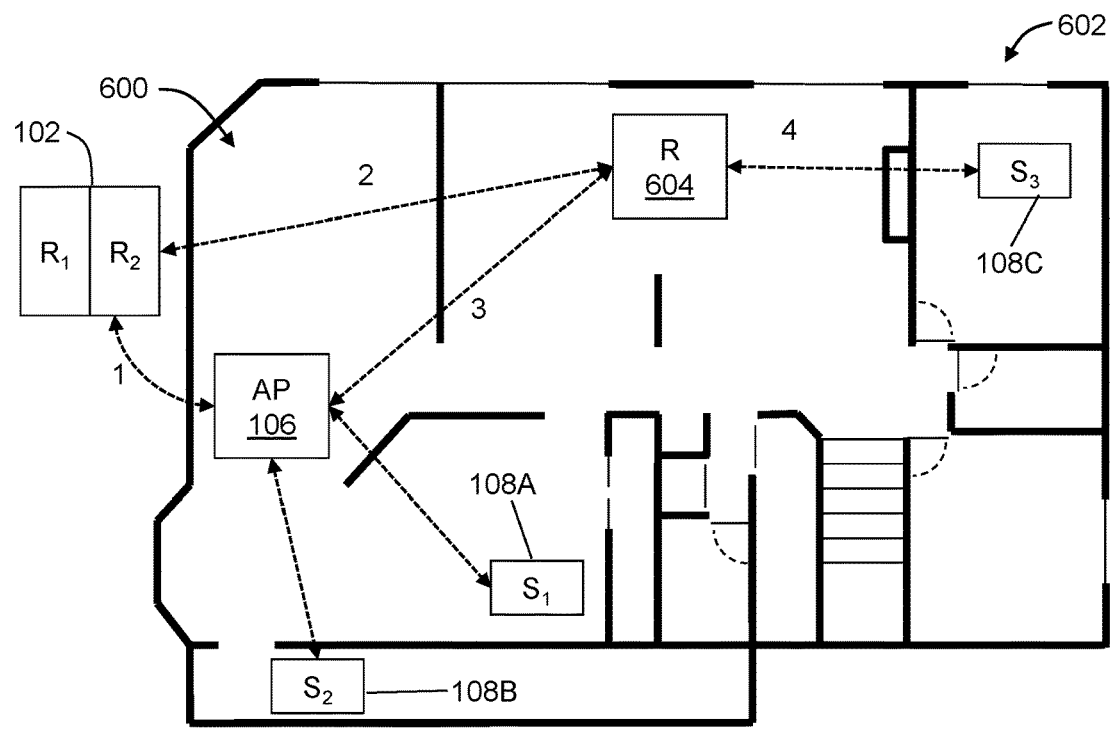
FIG. 6 illustrates a second example use case of the reconfigurable multi-radio bridge of FIG. 1.

FIG. 6 illustrates a second example use case of the bridge 102 of FIG. 1, arranged in accordance with at least one implementation described herein. FIG. 6 illustrates the bridge 102 and a LAN 600 at a house, building, or other location 602. The LAN 600 may include the AP 106, the first STA 108A, the second STA 108B, the third STA 108C, and a repeater 604.

In FIG. 6, metrics such as link quality, number of hops, delay, or jitter may be evaluated for each of multiple routes to a given STA, such as the third STA 108C. A first route from the bridge 102 to the STA 108C includes links labeled 1, 3, and 4 in FIG. 6. A second route from the bridge 102 to the STA 108C includes links labeled 2 and 4 in FIG. 6. The bridge 102 and/or the AP 106 may determine which route to use based on one or more of the metrics. A single metric may be used or a combination. If hops is the only metric used, for example, the second route that includes links 2 and 4 may be used for traffic to the third STA 108C since it has fewer hops than the first route that includes links 1, 3, and 4. Alternatively, if link quality is the only metric used and the first route that includes links 1, 3, and 4 has better link quality than the second route that includes links 2 and 4, then the first route that includes links 1, 3, and 4 may be used for traffic to the third STA 108C. Alternatively, if multiple metrics are used to determine the route, a weighted score may be calculated for each route with contributions from each of multiple metrics and the route with the highest weighted score may be selected for traffic to the third STA 108C. Other methods may be implemented to determine which of multiple routes to use to send traffic to a given STA 108.

With combined reference to FIGS. 4 and 6, evaluating the metric for each of the at least two routes at block 404 may include determining at least one of link quality, delay, number of hops, and jitter of the first route to the third STA 108C (links 1, 3, and 4) and of the second route to the third STA 108C (links 2 and 4) and determining which of the first route and the second route has at least one of higher link quality, shorter delay, fewer hops, and lower jitter. Selecting the route based on the metric at block 408 may include selecting the first route or the second route that has the at least one of higher link quality, shorter delay, fewer hops, and lower jitter.

In another implementation, the method 400 may also include repeatedly evaluating the metric over a period of time (e.g., an interval, threshold, countdown timer, staleness factor, trigger, etc.) for each of the at least two routes and/or nodes discovered in the topology. The method 400 may also include receiving multiple packets that identify the third STA 108C as the intended destination of each of the packets. The method 400 may also include repeatedly selecting, over time, a route of the at least two routes over which to send the packets based on the metric. The method may also include sending, over time, each packet from the bridge 102 over the selected route. The selected route at any given time may depend on the evaluated metric for each of the at least two routes at any given time such that a first packet may be sent over the first route (links 1, 3, and 4) at a first time and a second packet may be sent over a second route at a second time (links 2 and 4).

In another implementation, the packet received at block 406 may include a first packet received at a first time and the selected route over which the first packet is sent may include the first route (links 1, 3, and 4). The method 400 may also include, after sending the first packet over the first route at block 410, re-evaluating the metric for each of the at least two routes. The method 400 may also include receiving a second packet at a second time after the first time, the second packet identifying the third STA 108C as the intended destination of the second packet. The method 400 may also include selecting the second route (links 2 and 4) over which to send the packet based on the metric, the second route being different than the first route. The method 400 may also include sending the second packet from the bridge 102 over the second route toward the third STA 108C.

Figure 7A:
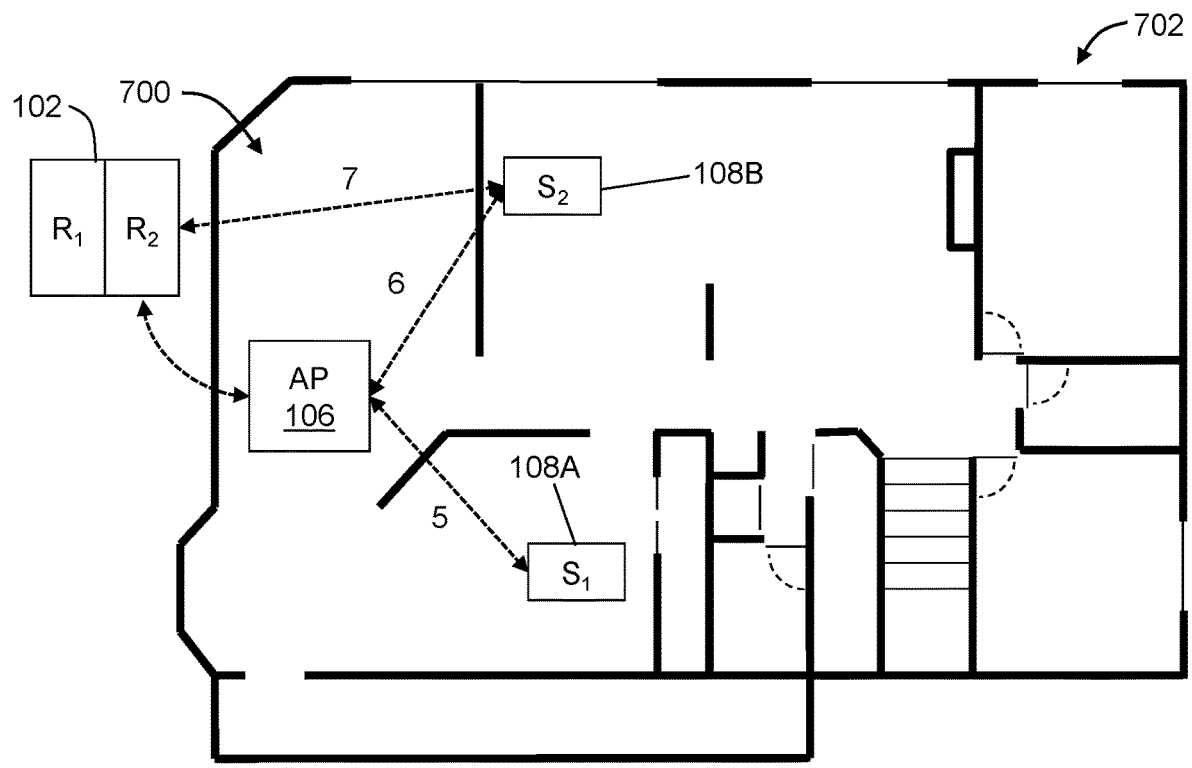
FIGS. 7A and 7B illustrate a third example use case of the reconfigurable multi-radio bridge of FIG. 1.
Figure 7B:
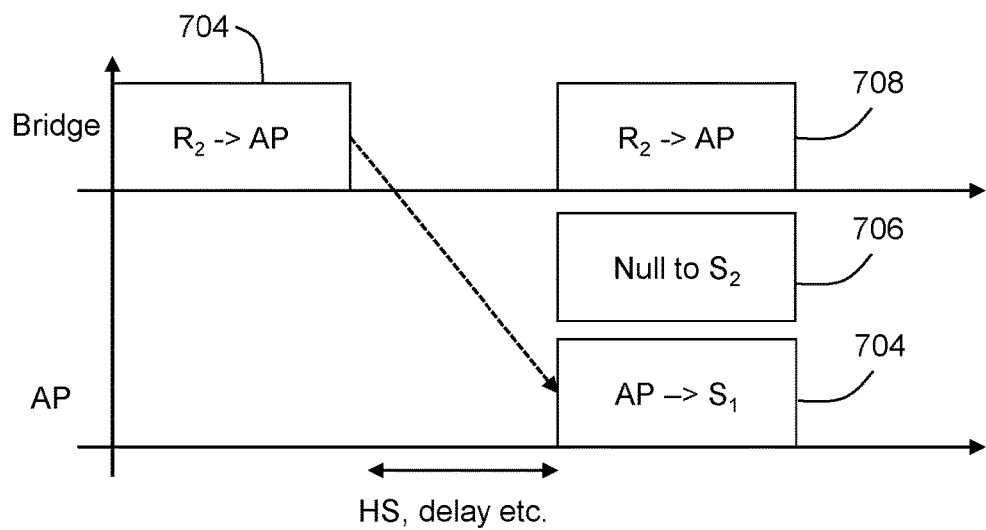

FIGS. 7A-7B illustrate a third example use case of the bridge 102 of FIG. 1, arranged in accordance with at least one implementation described herein. FIG. 7A illustrates the bridge 102 and a LAN 700 at a house, building, or other location 702. The LAN 700 may include the AP 106, the first STA 108A and the second STA 108B.

The first STA 108A may be directly connected to the AP 106 via a first channel 5 from the AP 106 directly to the first STA 108A. There is a second channel 6 from the AP 106 directly to the second STA 108B. The second STA 108B may be directly connected to the bridge 102 via a third channel 7 from the bridge 102 directly to the second STA 108B. There is also a fourth channel (not labeled) from the bridge 102 directly to the first STA 108A.

The bridge 102 and the AP 106 may coordinate to simultaneously send traffic to the first and the second STAs 108A, 108B over, respectively, the first channel 5 and the third channel while also actively nulling on the second channel 6 and/or the fourth channel.

With combined reference to FIGS. 4 and 7A, the bridge 102 may coordinate with the AP 106 to effect simultaneous transmission of: a first packet from the AP 106 directly to the first STA 108A over the first channel 5 included in the selected route, a nulling signal from the AP 106 directly to the second STA 108B over the second channel 6, and a second packet from the bridge 102 directly to the second STA 108B over the third channel 7. The nulling signal sent to the second STA 108B over the second channel 6 in this example may be configured to null interference at the second STA 108B from transmission of the first packet to the first STA 108A over the first channel 5. In an implementation, the bridge 102 may also transmit a nulling signal from the bridge 102 directly to the first STA 108A over the fourth channel. The nulling signal sent to the first STA 108A over the fourth channel in this example may be configured to null interference at the first STA 108A from transmission of the second packet to the second STA 108B over the third channel 7. The method 400 may also include estimating channels conditions of each of the first channel 5, the second channel 6, the third channel 7, and/or the fourth channel. One or more of the estimated channel conditions may be used to generate the nulling signal.

Alternatively or additionally, the method 400 may also include receiving a second packet that identifies the second STA 108B as an intended destination of the second packet. Selecting the route over which to send the packet at block 408 may include selecting a route that includes the first channel 5 from the AP 106 directly to the first STA 108A. The method 400 may also include selecting a second route over which to send the second packet, the second route including the third channel 7 from the bridge 102 directly to the second STA 108B. The method 400 may also include sending the first packet to the AP 106 to send to the first STA 108A. The method 400 may also include coordinating with the AP 106 to send the first packet to the first STA 108A over the first channel 5 while simultaneously sending a nulling signal over the second channel 6 from the AP 106 to the second STA 108B. The method 400 may also include sending the second packet to the second STA 108B over the third channel 7 simultaneously with the AP 106 sending the first packet over the first channel 5 and the nulling signal over the second channel 6.

In another example implementation, the bridge 102 and the AP 106 may coordinate to effect simultaneous packet transmission from the bridge 102 to the AP 106 and active nulling from the AP 106 to one or both of the STAs 108A, 108B.

FIG. 7B illustrates example packet transmission timing for coordinated transmission according to FIG. 7A. As illustrated, the bridge 102 first sends a first packet 704 to the AP 106. Subsequently, the AP 106 sends the first packet 704 to the first STA 108A, the AP 106 sends a nulling signal 706 to the second STA 108B, and the bridge 102 sends a second packet 708 to the second STA 108B, all simultaneously or substantially simultaneously.

Figure 8A:
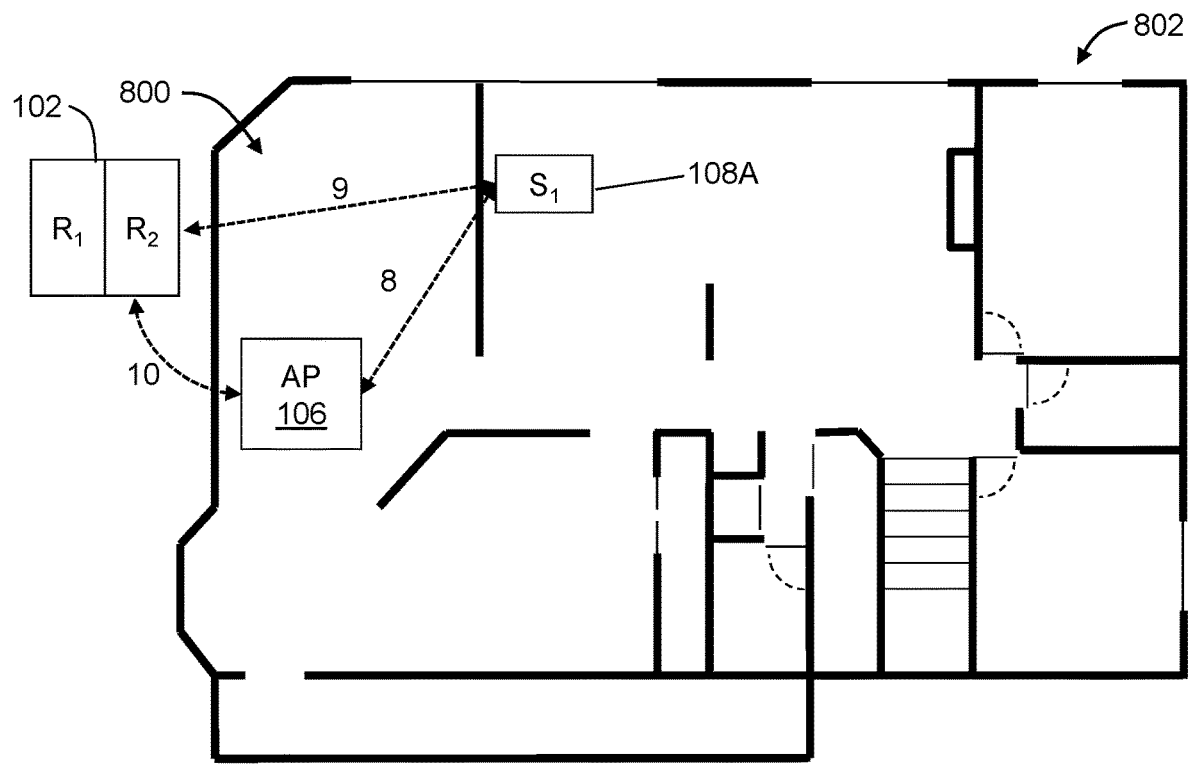
FIGS. 8A and 8B illustrate a fourth example use case of the reconfigurable multi-radio bridge of FIG. 1.
Figure 8B:
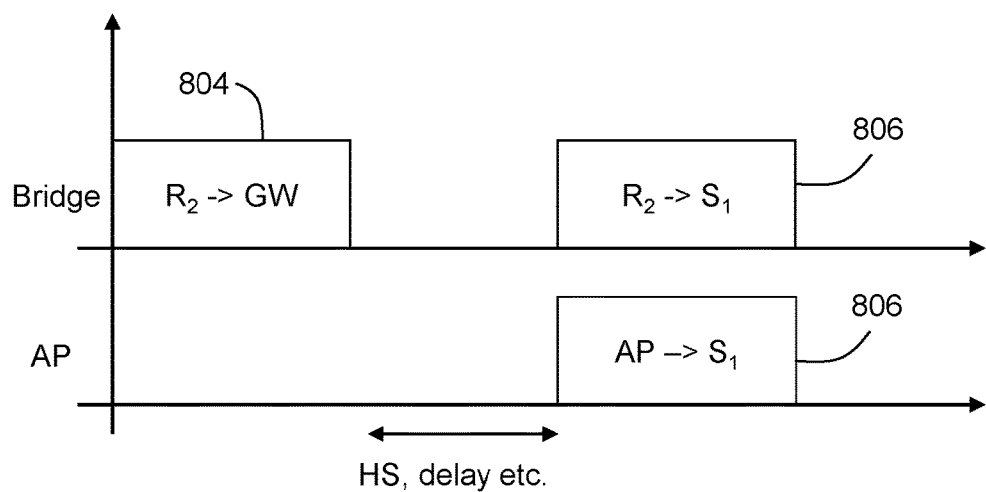

FIGS. 8A-8B illustrate a fourth example use case of the bridge 102 of FIG. 1, arranged in accordance with at least one implementation described herein. FIG. 8A illustrates the bridge 102 and a LAN 800 at a house, building, or other location 802. The LAN 800 may include the AP 106 and the first STA 108A.

There is a first channel 8 between the AP 106 and the first STA 108A, a second channel 9 between the bridge 102 and the first STA 108A, and a third channel 10 between the bridge 102 and the AP 106.

The bridge 102 and the AP 106 may coordinate to send the same traffic from both the bridge 102 and the AP 106 to the first STA 108A over the first channel 8 and the second channel 9 in a distributed MIMO arrangement. By coordinating, the bridge 102 and the AP 106 may form a distributed MIMO transmitter.

With combined reference to FIGS. 4 and 8A, the bridge 102 may coordinate transmission with the AP 106 to effect simultaneous transmission of: a packet over the first channel 8 from the AP 106 directly to the first STA 108A and the same packet over the second channel 9 from the bridge 102 directly to the first STA 108A. Prior to the coordinated transmission, the method 400 may also include estimating channels conditions of each of the first channel 8 and the second channel 9. One or more of the estimated channel conditions may be used to transmit the packet from both the bridge 102 and the AP 106 to the first STA 108A.

Alternatively or additionally, selecting the route over which to send the packet at block 408 may include selecting a distributed MIMO route that includes both the first channel 8 from the AP 106 directly to the first STA 108A and the second channel 9 from the bridge 102 directly to the first STA 108A. The method 400 may also include sending the packet to the AP 106, e.g., via the third channel 10. The method may also include coordinating with the AP 106 to send the packet to the first STA 108A over the first channel 8 while simultaneously sending the packet to the first STA 108A over the second channel 9. Prior to the coordinated transmission, the method 400 may also include deriving first precoders to use for the first channel 8 and the second channel 9 when implemented as independent routes. The method 400 may also include deriving second precoders to use for the first channel 8 and the second channel 9 when implemented together as the distributed MIMO route.

FIG. 8B illustrates example packet transmission timing for coordinated transmission according to FIG. 8A. As illustrated, the bridge 102 first sends a first packet 804 to the AP 106 via the third channel 10. Subsequently, the AP 106 sends the first packet 804 to the first STA 108A via the first channel 8 while the bridge 102 also sends the first packet 804 to the first STA 108A, all simultaneously or substantially simultaneously.

Figure 9A:
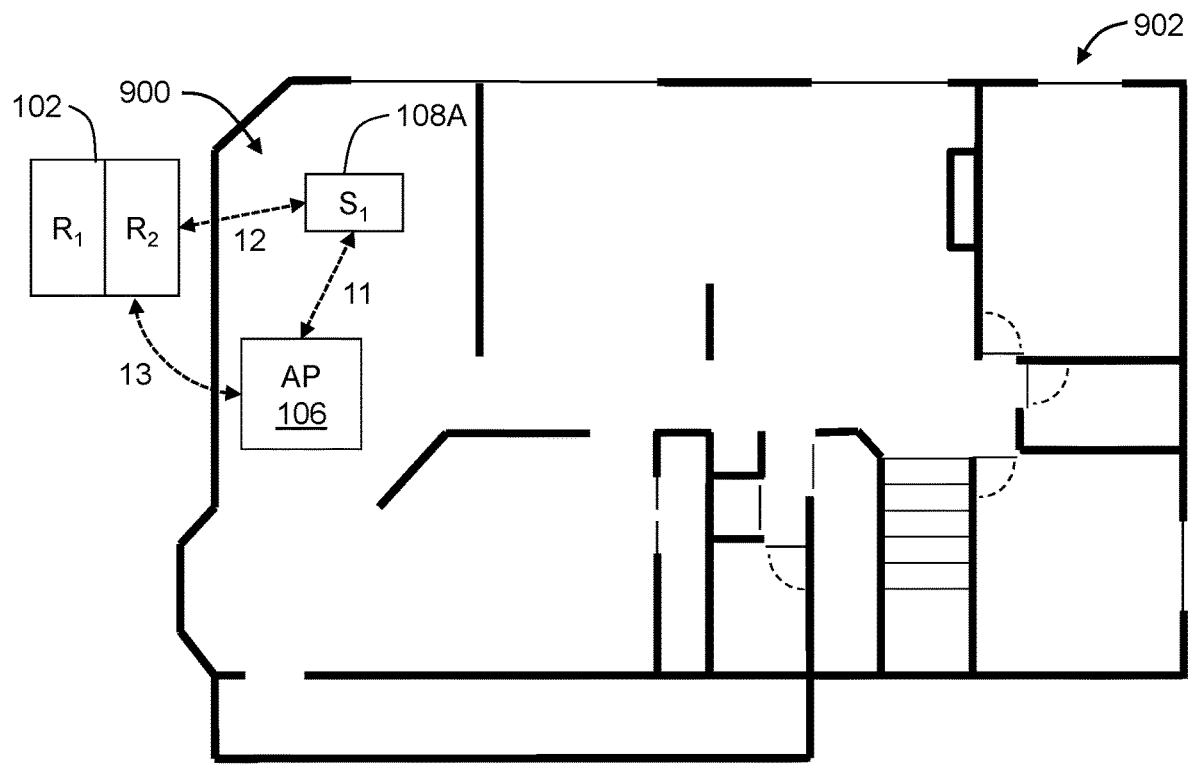
FIGS. 9A and 9B illustrate a fifth example use case of the reconfigurable multi-radio bridge of FIG. 1.

FIG. 9A illustrates a fifth example use case of the bridge 102 of FIG. 1, arranged in accordance with at least one implementation described herein. FIG. 9A illustrates the bridge 102 and a LAN 900 at a house, building, or other location 902. The LAN 900 may include the AP 106 and the first STA 108A. FIG. 9A also illustrates a first channel 11 between the AP 106 and the first STA 108A, a second channel 12 between the bridge 102 and the first STA 108A, and a third channel 13 between the bridge 102 and the AP 106.

As already described, traffic may be transmitted from the bridge 102 to the first STA 108A directly or through the AP 106 where the particular route (e.g., direct or through the AP 106) may depend on, e.g., channel conditions of each of the routes. Alternatively, different traffic with at least one nulling signal may be simultaneously transmitted from the bridge 102 and the AP 106 to the first and second STAs 108A and 108B as described with respect to FIGS. 7A and 7B and/or traffic may be transmitted to the first STA 108 from both the bridge 102 and the AP 106 in a distributed MIMO arrangement as described with respect to FIGS. 8A and 8B.

Alternatively or additionally, main transmissions may be sent over one route, such as from the bridge 102 to the AP 106 to the first STA 108A, while any retransmissions may be sent over another route, such as from the bridge 102 directly to the first STA 108A.

With combined reference to FIGS. 4 and 9A, the method 400 may also include selecting a first route that includes either the first channel 11 from the AP 106 directly to the first STA 108A or the second channel 12 from the bridge 102 directly to the first STA 108A over which to send packet transmissions to the first STA 108A. The method 400 may also include selecting a second route that includes the other of the second channel 12 from the bridge 102 directly to the first STA 108A or the first channel 11 from the AP 106 directly to the first STA 108A over which to send packet retransmissions to the first STA 108A. The method 400 may also include sending packet transmissions to the first STA 108A over the selected first route. The method 400 may also include sending packet retransmissions to the first STA 108A over the selected second route.

In another implementation, selecting the route over which to send the packet at block 408 may include selecting a route that includes one of the first channel 11 from the AP directly to the first STA 108A or the second channel 12 from the bridge 102 directly to the first STA 108A. Sending the packet over the selected route at block 410 may include sending the packet over one of the first channel 11 or the second channel 12 to the first STA 108A. The method 400 may also include, if the packet is sent over the first channel 11, retransmitting the packet from the bridge 102 directly to the first STA 108A over the second channel 12. Alternatively, the method 400 may also include, if the packet is sent over the second channel 12, retransmitting the packet from the AP 106 directly to the first STA 108A over the first channel 11.

Figure 9B:
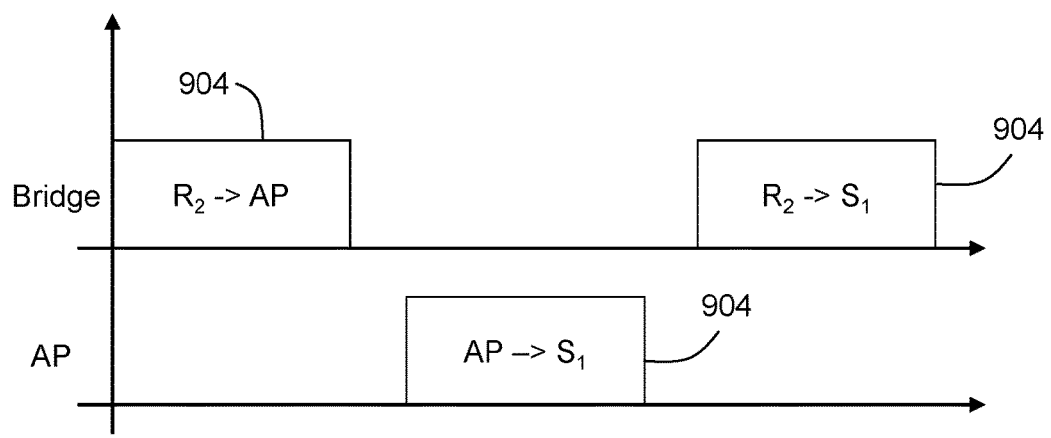

FIG. 9B illustrates example packet transmission timing according to FIG. 9A. As illustrated, the bridge 102 first sends a first packet 904 to the AP 106 via the third channel 13. Subsequently, the AP 106 sends the first packet 904 to the first STA 108A via the first channel 11. Subsequently, retransmission of the first packet 904 is sent from the bridge 102 to the first STA 108A via the second channel 12.

Figure 10A:
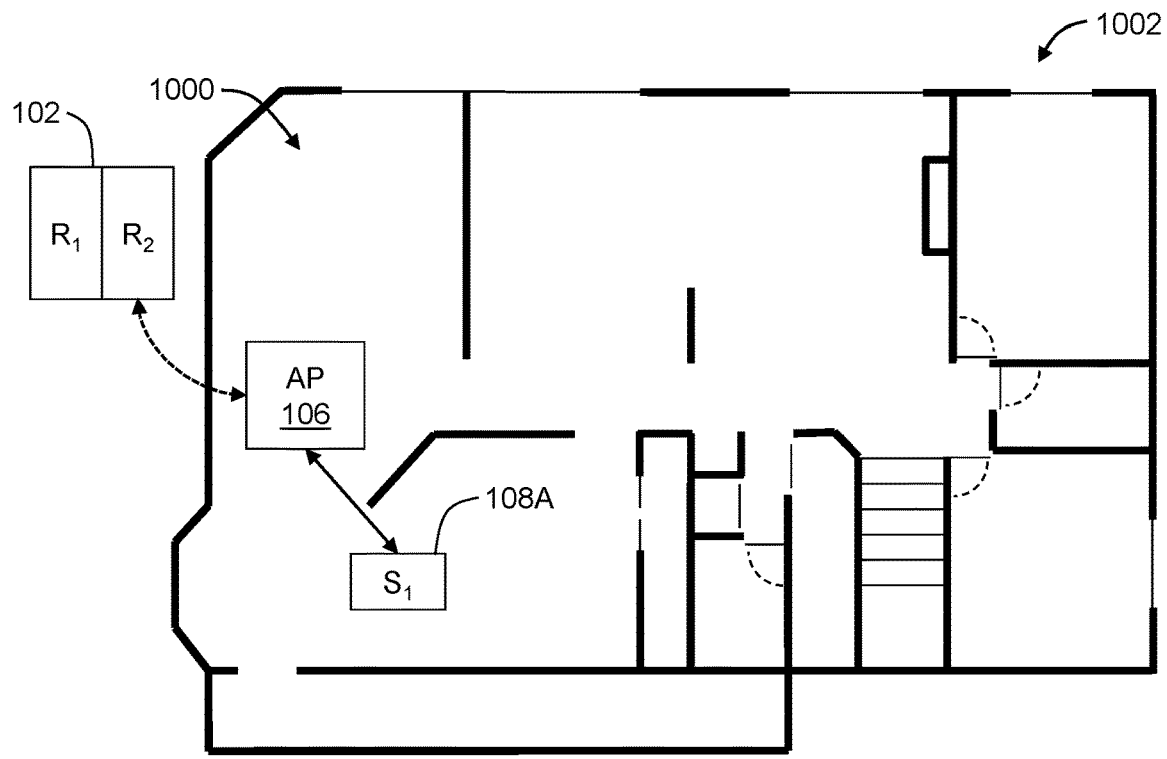
FIGS. 10A and 10B illustrate a sixth example use case of the reconfigurable multi-radio bridge of FIG. 1.
Figure 10B:
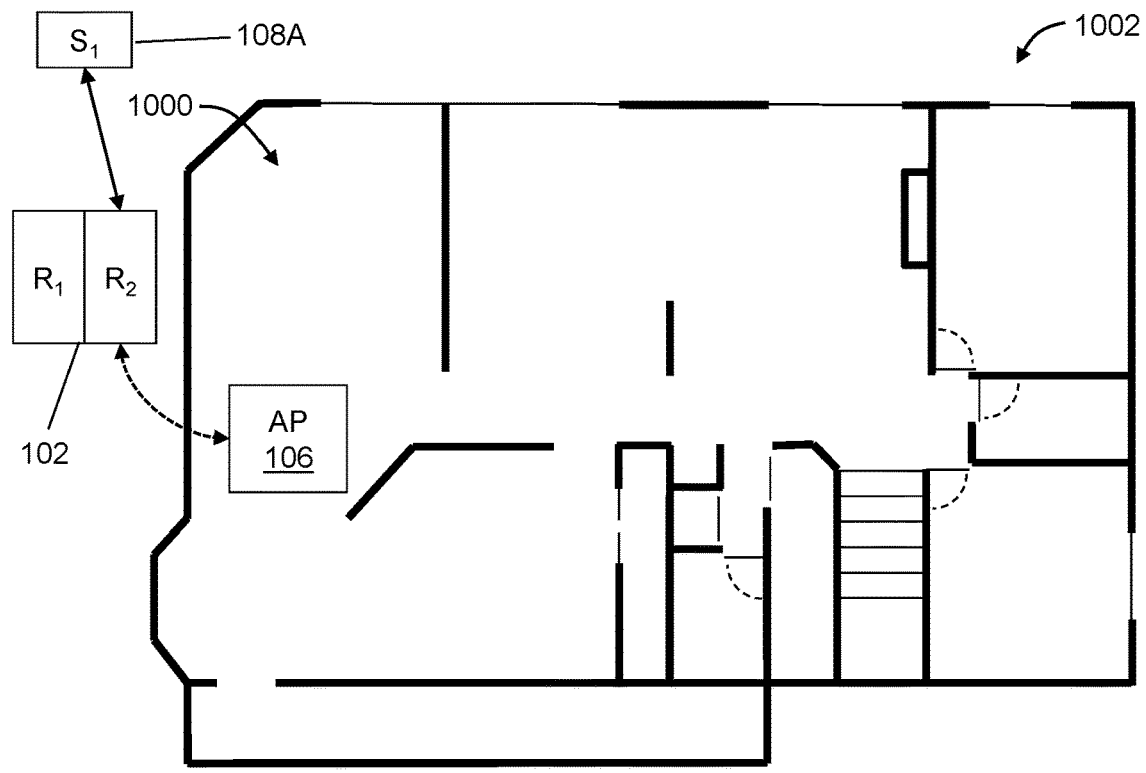

FIGS. 10A and 10B illustrate a sixth example use case of the bridge 102, arranged in accordance with at least one implementation described herein. FIGS. 10A and 10B illustrates the bridge 102 and a LAN 1000 at a house, building, or other location 1002. The LAN 1000 may include the AP 106 and/or the first STA 108A.

The bridge 102 may improve coverage for STAs 108 such as the first STA 108A that have associated with the AP 106 in the past and move to locations with inadequate coverage from the AP 106 and with adequate coverage from the bridge 102. For example, referring to FIG. 10A, the first STA 108A may associate with the AP 106 within the house 1002 where the AP 106 has adequate coverage for a connection. As illustrated in FIG. 10B, however, if the first STA 108A moves to a location outside of the house 1002 or otherwise outside a coverage area of the AP 106 and within a coverage area of the bridge 102, the bridge 102 may extend coverage to the first STA 108A.

The bridge 102 may periodically or in response to a trigger replicate a BSS of the AP 106. If link setup occurs, e.g., if the first STA 108A sends an association request to the bridge 102, the bridge 102 may maintain the BSS and establish a link directly between the first STA 108 and the bridge 102 to send traffic to the first STA 108 while bypassing the AP 106.

With combined reference to FIGS. 4, 10A, and 10B, sending the packet from the bridge 102 over the selected route at block 410 may include sending the packet to the AP 106 for the AP 106 to send to the first STA 108A over a first link from the AP 106 directly to the first STA 108A in the arrangement illustrated in FIG. 10A. The method 400 may also include replicating a BSS of the AP 106 at the bridge 102. The method 400 may also include establishing a second link directly between the first STA and the bridge 102 in response to the bridge replicating the BSS of the AP 106. The method 400 may also include sending additional packets to the first STA 108A over the second link. The bridge 102 may periodically replicate the BSS and maintain it when the first STA 108A or another STA 108 associates with the bridge 102. Alternatively or additionally, the bridge 102 may replicate the BSS in response to a BSS-replication trigger and may maintain it when the first STA 108A or another STA 108 associates with the bridge 102.

The BSS-replication trigger may include a determination that a first interference level of the first link exceeds: a threshold interference level or a second interference level of the second link. Alternatively or additionally, the BSS-replication trigger may include a determination that a first RSSI of the first link is less than: a threshold RSSI or a second RSSI of the second link. Alternatively or additionally, the BSS-replication trigger may include a command from the AP 106.

The bridge 102 may terminate the BSS and the second link in response to a BSS-termination trigger. The BSS-termination trigger may include a determination that the second interference level of the second link exceeds: the threshold interference level or the first interference level of the first link. Alternatively or additionally, the BSS-termination trigger may include a determination that the second RSSI of the second link is less than: the threshold RSSI or the first RSSI of the first link. Alternatively or additionally, the BSS-termination trigger may include a command from the AP 106.

Figure 11:
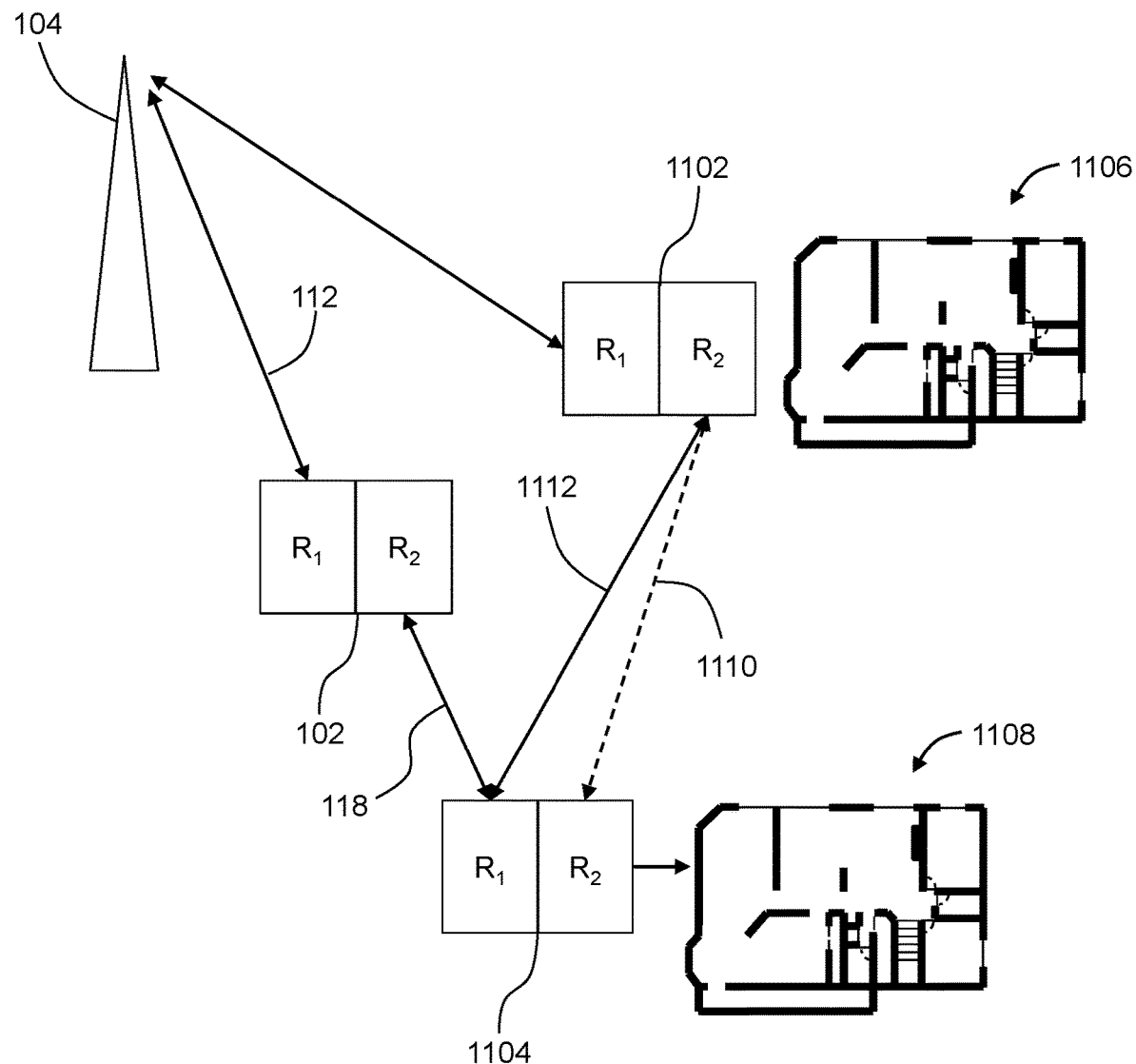
FIG. 11 illustrates a seventh example use case of the reconfigurable multi-radio bridge of FIG. 1.

FIG. 11 illustrates a seventh example use case of the bridge 102, arranged in accordance with at least one implementation described herein. FIG. 11 illustrates the bridge 102, the base station 104, a second reconfigurable multi-radio bridge 1102 ("second bridge 1102"), a third reconfigurable multi-radio bridge 1104 ("third bridge 1104"), and houses, buildings, or other locations 1106, 1108 that may be in a respective coverage area of the corresponding second or third bridges 1102, 1104.

The third bridge 1104 and/or the location 1108 may be shadowed from the base station 104 or may otherwise lack adequate coverage from the base station. The bridge 102 may extend the backhaul link 112 to the third bridge 1104 by providing the backhaul relay link 118 to the third bridge 1104. In this implementation, the first and second reconfigurable radios $R_1$ and $R_2$ of the bridge 102 may be configured to operate at the same frequency and/or frequency band, and in particular within a frequency band that may be reserved for and/or associated with wireless backhaul links.

Alternatively or additionally, the second bridge 1102 may adaptively reconfigure itself to selectively provide a WAP link 1110 to the third bridge 1104 and a backhaul relay link 1112 to the third bridge 1104. For example, the second radio $R_2$ of the second bridge 1102 may adaptively reconfigure itself to provide the WAP link 1110 by operating at the same frequency band as the second radio $R_2$ of the third bridge 1104 or to provide the backhaul relay link 1112 by operating at the same frequency band as the first radio $R_1$ of the third bridge 1104.

Accordingly, in an implementation, the, bridge 102 may be programmed as a backhaul relay and may not collect and/or evaluate metrics and/or adaptively change or adjust the transmission method.

Alternatively, the bridge 102 may adaptively configure itself as a backhaul relay responsive to the collection and measurement of one or more metrics. With combined reference to FIGS. 4 and 11, for example, the bridge 102 may provide the backhaul link 112 to the base station 104. Evaluating the metric for each of at least two routes discovered in the topology at block 404 may include evaluating a metric for a first route that reaches a first STA, e.g., in a LAN at the house 1108, through the backhaul relay link 118 to the third bridge 1104 and a second route that bypasses the third bridge 1104 to reach the first STA. Selecting the route at block 408 may include selecting the first route. Sending the packet from the bridge 102 over the selected route toward the first STA at block 410 may include sending the packet to the third bridge 1104 over the backhaul relay link 118.

Figure 12:
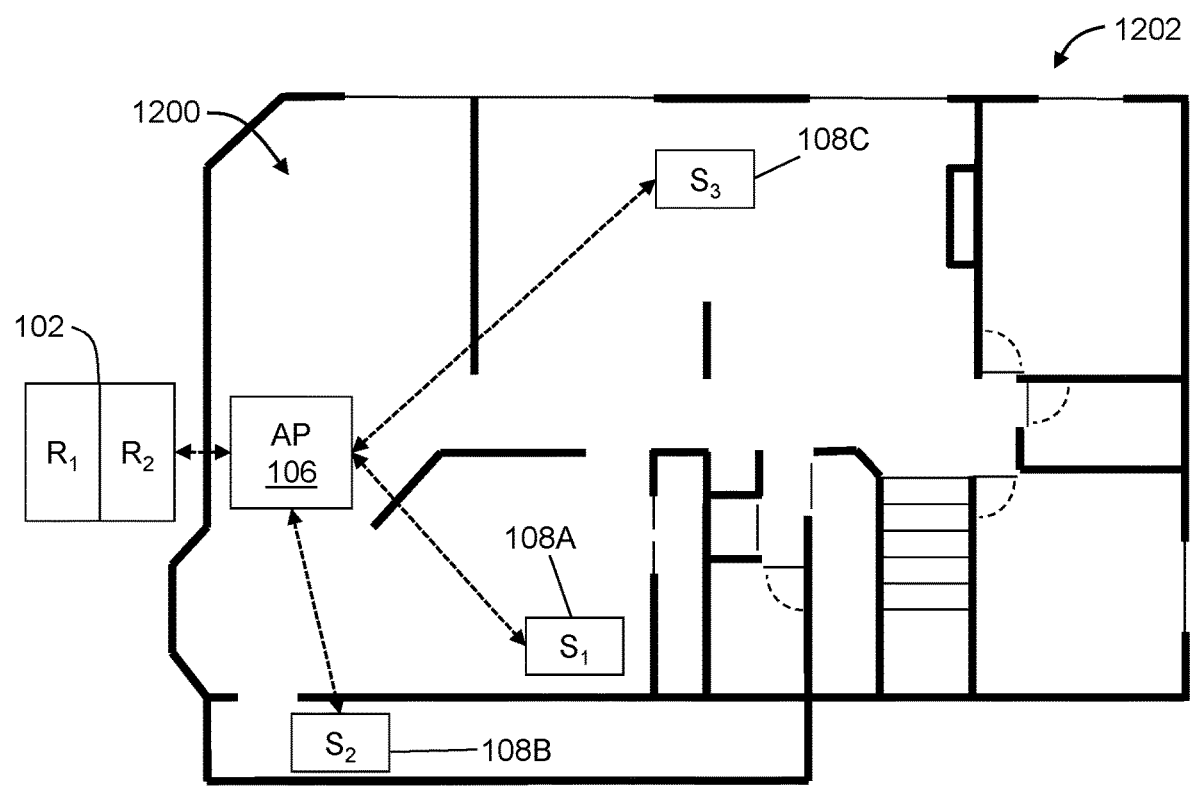
FIG. 12 illustrates an eighth example use case of the reconfigurable multi-radio bridge of FIG. 1.

FIG. 12 illustrates an eighth example use case of the bridge 102, arranged in accordance with at least one implementation described herein. FIG. 12 illustrates the bridge 102 and a LAN 1200 at a house, building, or other location 1202. The LAN 1200 may include the AP 106, the first STA 108A, the second STA 108B, and the third STA 108C.

In the example of FIG. 12, the bridge 102 may have fixed role programming as a bridge between the backhaul network and the LAN 1200. Accordingly, the bridge 102 in the example of FIG. 12 may not collect and/or evaluate metrics and/or adaptively change or adjust the transmission method.

Implementations described herein may alternatively or additionally implement NAV sharing, with or without a reconfigurable multi-radio bridge. NAV sharing may generally include sharing a single NAV across two or more hops of a multi-hop transmission. By sharing the NAV, channel access done at a first node may be used to access and reserve a sufficient transmission window for multiple hops without having to do channel access at a second (or more) downstream node(s) from the first node. Accordingly, NAV sharing may reduce overhead, decrease delay, and/or provide other benefits.

In an example implementation of NAV sharing, a first node receives traffic, such as a data packet, for a destination node. The network may further include an intermediate node between the first node and the destination node where traffic from the first node to the destination node is routed through the intermediate node. The first node may estimate a total duration of time to transmit the packet from the first node to the destination node through the intermediate node and/or through multiple hops.

Some networks impose constraints on transmission windows such as a maximum or threshold duration of time per transmission window. Reserving a transmission window with a duration in excess of the maximum or threshold duration may not be permitted. Accordingly, if the total duration of time for the multi hop transmission is less than the maximum or threshold duration, the first node may reserve a shared transmission window for the entire multi hop transaction and send the packet to the destination node through the intermediate node. Alternatively or additionally, MCS of each of the channel between the first node and the intermediate node and the channel between the intermediate node and the destination node may be calculated and/or analyzed to determine whether the multi hop transaction may be completed within a transmission window less than the maximum or threshold duration.

The first node may reserve the shared transmission window for multiple hops, as opposed to the first node reserving a transmission window for the first hop and the intermediate node reserving a transmission window for the second hop, in any suitable manner. For example, the shared transmission window may be reserved using a request to send (RTS)/clear to send (CTS)-2 exchange.

Alternatively or additionally, the first node and the intermediate node may handshake in advance to establish NAV sharing for packets of suitable size intended for the destination node. A suitable size may refer to any size packet that may be transmitted from the first node to the intermediate node to the destination node within a shared transmission window less than the maximum or threshold duration. The upper limit for the suitable size may depend on the channels from the first node to the intermediate node and the intermediate node to the destination node. For example, the upper limit suitable size for channels with a first channel quality and/or throughput may be less than the upper limit suitable size for channels with a higher second channel quality and/or throughput.

Figure 13A:
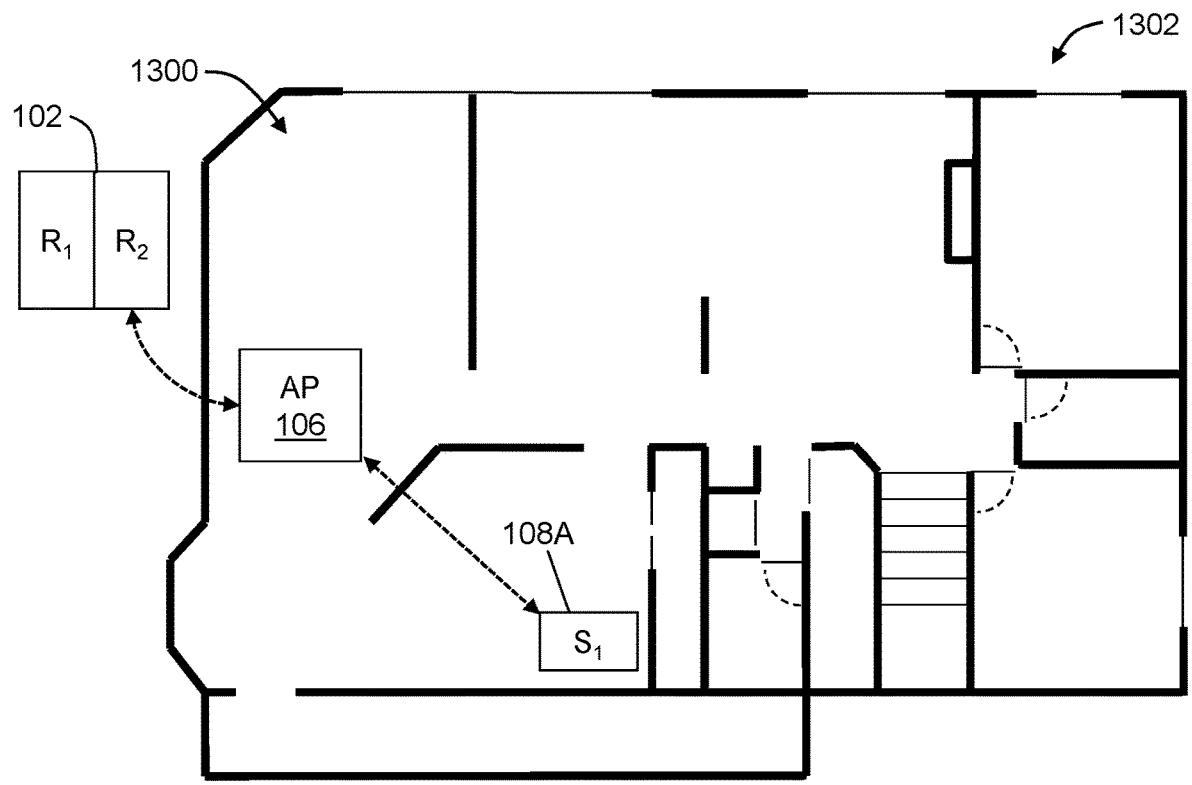
FIGS. 13A and 13B illustrate a ninth example use case of the reconfigurable multi-radio bridge of FIG. 1, all arranged in accordance with at least one implementation described herein.
Figure 13B:
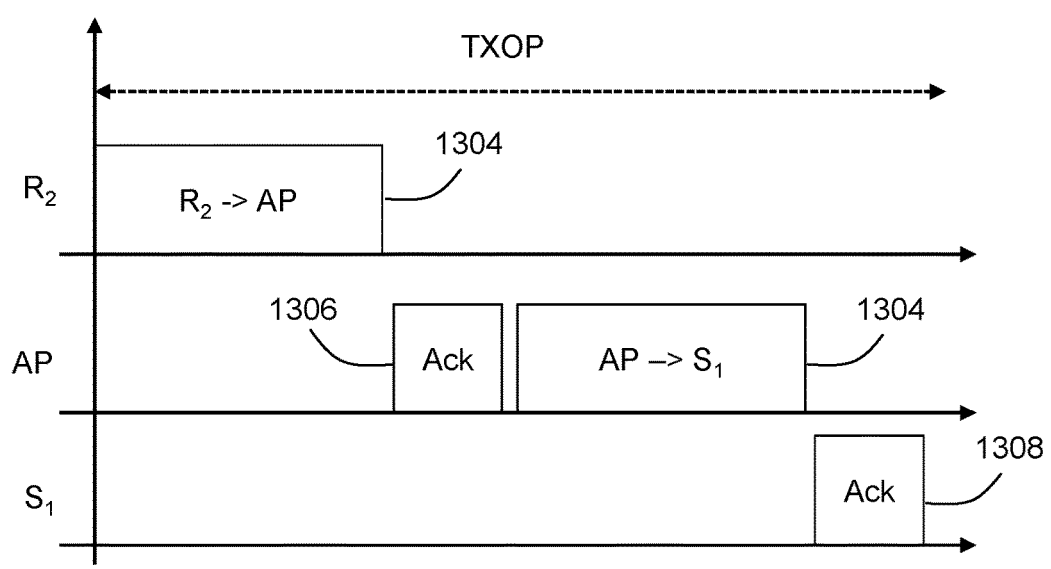

To reserve the shared transmission window, the first node may specify a corresponding transmit opportunity (TXOP) in the packet header. When the intermediate node receives the packet for the destination node where the packet has a suitable size, the intermediate node may transmit the packet to the destination without separately reserving the channel. An example of NAV sharing with the bridge 102 will now be described with respect to FIGS. 13A and 13B FIGS. 13A and 13B illustrate a ninth example use case of a reconfigurable multi-radio bridge, arranged in accordance with at least one implementation described herein. FIG. 13 illustrates the bridge 102 and a LAN 1300 at a house, building, or other location 1302. The LAN 1300 may include the AP 106 and the first STA 108A.

With combined reference to FIGS. 4 and 13A, evaluating the metric for each of the at least two routes at block 404 may include evaluating the metric for a first link from the AP 106 to the first STA 108A and for a second link from the bridge 102 to the first STA 108A and determining that the first link has a better metric than the second link. Selecting the route based on the metric at block 408 may include selecting the first link. The method 400 may also include determining a total duration or shared transmission window to send the packet from the bridge 102 to the AP 106 and from the AP 106 to the first STA 108A. The method 400 may also include reserving a TXOP equal to or greater than the total duration. Sending the packet from the bridge 102 over the selected route toward the first STA 108A at block 410 may include sending the packet from the bridge 102 to the AP 106 during a first portion of the reserved TXOP. The AP 106 may then send the packet to the first STA 108A during a remainder portion of the reserved TXOP, e.g., without separately reserving a TXOP.

FIG. 13B illustrates example packet transmission timing according to FIG. 13A. As illustrated, the bridge 102 first sends a packet 1304 to the AP 106 and reserves a transmission window TXOP having a greater duration than the duration to send the packet 1304 from the bridge 102 to the AP 106. Subsequently, the AP 106 sends an Ack 1306 to the bridge 102 and sends the packet 1304 to the first STA 108A. Subsequently, the first STA 108A sends an Ack 1308 to the AP 106.

Unless specific arrangements are mutually exclusive with one another, the various implementations described herein can be combined to enhance system functionality and/or to produce complementary functions. Such combinations will be readily appreciated by the skilled addressee given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It with, therefore, be appreciated that the above description has been given by way of example only and that modification in detail may be made within the scope of the present invention.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be multiple-input multiple-output (MIMO) apparatus supporting as many as N×N discrete communication streams over N antennas. In an example the MIMO apparatus signal processing units can be implemented as N×N. In various embodiments, the value of N can be 4, 6, 8, 12, 16, etc. Extended MIMO operation enable the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

CSI from any of the communication links described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, and the like.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform or control performance of a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

For example, implementations of the reconfigurable multi-bridge described in FIG. 4 one or more processors can be configured to discover connection options for nodes in a network.

To control communication with a node of the network, the processor can evaluate metrics for each route for the node based on the communication metrics. In an example method, the processor receives a packet that identifies the node, selects a route over which to send the packet based on the evaluated metrics, and sends the packet from a reconfigurable multi-radio bridge over the selected route toward the first STA. The processor can receive a packet in a first frequency band and send packets in a second frequency band different from the first frequency band.

In an example implementation, the network includes an access point, where evaluating the metric for each the routes includes determining link quality of a first link between the AP and the first STA and of a second link between the reconfigurable multi-radio bridge and the first STA and determining which of the first link and the second link has higher link quality. Then selecting the route can be based on the metric including selecting the first link or the second link that has the higher link quality. In another example, the first link can be determined to have higher link quality than the second link, the first link is selected as the route that has the higher link quality; and the sending the packet over the selected route includes sending the packet from the reconfigurable multi-radio bridge to the AP for the AP to send to the first STA. Further, the second link can be determined to have higher link quality than the first link, then the second link is selected as the route that has the higher link quality; and the sending the packet over the selected route includes sending the packet from the reconfigurable multi-radio bridge directly to the first STA.

In another example implementation, the network includes an access point and evaluates metrics routes by determining at least one of link quality, delay, number of hops, and jitter. The processor can select an optimal route based on the metrics with at least one of higher link quality, shorter delay, fewer hops, and lower jitter.

The processor can also repeatedly evaluate the metric over time for each of the routes discovered associated with the station; repeatedly determine, over time, an optimal route based on recalculated metrics or changes in the LAN performance; and send, over time, each packet of the plurality of packets from the reconfigurable multi-radio bridge over different selected route based on the repeatedly determined optimal route.

In another example implementation, the processor can after send a first packet over the first route, re-evaluating the metric for each of the at least two routes; receive a second packet at a second time after the first time, the second packet identifying the first STA as the intended destination of the second packet; select a second route of the at least two routes over which to send the packet based on the metric, the second route being different than the first route; and send the second packet from the reconfigurable multi-radio bridge over the second route toward the first STA.

In an example, the processor can coordinate with an AP to effect simultaneous transmission of: the packet from the AP directly to the first STA over a first channel included in the selected route; a nulling signal from the AP directly to the second STA over a second channel; and a second packet from the reconfigurable multi-radio bridge directly to the second STA over a third channel. Further, the processor can estimate channels conditions of each of the first channel, the second channel, and the third channel.

The processor can estimate channel conditions of each channel from the AP directly to a first STA, each channel from the AP directly to a second STA, and each channel from the reconfigurable multi-radio bridge directly to the second STA. Then in response to the processor receiving a second packet that identifies the second STA as an intended destination of the second packet, it selects the route over which to send the packet includes selecting a route that includes the first channel from the AP directly to the first STA; selecting a second route over which to send the second packet, the second route including the third channel from the reconfigurable multi-radio bridge directly to the second STA. The processor can send the first packet to the AP to send to the first STA; coordinate with the AP to send the first packet to the first STA over the first channel while simultaneously sending a nulling signal over the second channel from the AP to the second STA; and sending the second packet to the second STA over the third channel simultaneously with the AP sending the first packet over the first channel and the nulling signal over the second channel. The processor can coordinate with an AP to effect simultaneous transmission of a packet over a first channel from the AP directly to the first STA; and the packet over a second channel from the reconfigurable multi-radio bridge directly to the first STA.

In some examples, the network further an access point and the processor estimates channel conditions of each of a first channel from the AP directly to the first STA and a second channel from the reconfigurable multi-radio bridge directly to the first STA; and selects the route over which to send the packet includes selecting a distributed multiple input multiple output (MIMO) route that includes both the first channel from the AP directly to the first STA and the second channel from the reconfigurable multi-radio bridge directly to the first STA. Then the processor can send the packet to the AP and/or coordinate with the AP to send the packet to the first STA over the first channel while simultaneously sending the packet to the first STA over the second channel. The processor can further derive first precoders to use for the first channel and the second channel when implemented as independent routes; and derive second precoders to use for the first channel and the second channel when implemented together as the distributed MIMO route.

In an example implementation where the network has an AP, then the processor can select a first route that includes either a first channel from the AP directly to the first STA or a second channel from the reconfigurable multi-radio bridge directly to the first STA over which to send packet transmissions to the first STA; and select a second route that includes the other of the second channel from the reconfigurable multi-radio bridge directly to the first STA or the first channel from the AP directly to the first STA over which to send packet retransmissions to the first STA. Then packet transmissions can be sent to the first STA over the selected first route; and additional packet retransmissions to the first STA over the selected second route.

Further, selecting the route over which to send the packet includes selecting a route can includes one of a first channel from the AP directly to the first STA or a second channel from the reconfigurable multi-radio bridge directly to the first STA; and sending the packet over the selected route includes sending the packet over one of the first channel or the second channel to the first STA. Then the processor can determine if the packet is sent over the first channel to retransmit the packet from the reconfigurable multi-radio bridge directly to the first STA over the second channel; or if the packet is sent over the second channel, retransmit the packet from the AP directly to the first STA over the first channel.

In another example, sending the packet from the reconfigurable multi-radio bridge over the selected route can include sending the packet to the AP for the AP to send to the first STA over a first link from the AP directly to the first STA. Then the processor replicates a basic service set (BSS) of the AP at the reconfigurable multi-radio bridge; establishes a second link directly between the first STA and the reconfigurable multi-radio bridge; and sends additional packets to the first STA over the second link.

In some examples, the reconfigurable multi-radio bridge periodically replicates the BSS, or the reconfigurable multi-radio bridge replicates the BSS in response to a BSS-replication trigger. The BSS-replication trigger can include one or more of: a determination that a first interference level of the first link exceeds: a threshold interference level or a second interference level of the second link; a determination that a first received signal strength indicator (RSSI) of the first link is less than: a threshold RSSI or a second RSSI of the second link; and a command from the AP. In response to a BSS-termination trigger, the BSS and the second link can be terminated.

In another example implementation, the reconfigurable multi-radio bridge provides a backhaul link to a base station. Then the processor can evaluate a metric for each of at least two routes discovered in the topology includes evaluating a metric for a first route that reaches the first STA through a backhaul relay link to a second reconfigurable multi-radio bridge and a second route that bypasses the second reconfigurable multi-radio bridge to reach the first STA; select the route includes selecting the first route; and send the packet from the reconfigurable multi-radio bridge over the selected route toward the first STA includes sending the packet to the second reconfigurable multi-radio bridge over the backhaul relay link.

In an example where the network includes a second reconfigurable multi-radio bridge, the reconfigurable multi-radio bridge can provide a backhaul link to a base station; and the reconfigurable multi-radio bridge can adaptively reconfigure itself to selectively provide: a wireless access point (WAP) link to the second reconfigurable multi-radio bridge; and a backhaul relay link to the second reconfigurable multi-radio bridge.

For a network with an AP, the processor can evaluate the metric for each of the at least two routes to evaluate the metric for a first link from the AP to the first STA and for a second link from the reconfigurable multi-radio bridge to the first STA and determining that the first link has a better metric than the second link; select the route based on the metric including selecting the first link. Then the processor can determine a total duration to send the packet from the reconfigurable multi-radio bridge to the AP and from the AP to the first STA; and reserve a transmit opportunity (TXOP) equal to the total duration. Sending the packet from the reconfigurable multi-radio bridge over the selected route toward the first STA can include sending the packet from the reconfigurable multi-radio bridge to the AP during a first portion of the reserved TXOP; and the AP can send the packet to the first STA during a remainder portion of the reserved TXOP.

Evaluating the metric for each of the at least two routes can include combinations of supported modulation and coding scheme (MCS); received signal strength indicator (RSSI); clear channel assessment (CCA) level; interference; estimated throughput; airtime; traffic priority; route congestion; and/or bridge/WAP load.

In an implementation, an example reconfigurable multi-radio bridge includes a first reconfigurable radio with a first transmit/receive (TX/RX) channel and a second TX/RX channel, where the first reconfigurable radio is configured to selectively transmit and receive data on the first TX/RX channel or the second TX/RX channel; and a second reconfigurable radio with a third TX/RX channel and a fourth TX/RX channel, where the second reconfigurable radio is configured to selectively transmit and receive data on the third TX/RX channel or the fourth TX/RX channel.

The example reconfigurable multi-radio bridge can be configured for the first TX/RX channel to include a first baseband (BB) circuit, a first radio frequency (RF) circuit, a first front end module (FEM), and a first antenna; the second TX/RX channel to include the first BB circuit, a second FEM, and a second antenna; the third TX/RX channel includes a second BB circuit, a second RF circuit, a third FEM, and a third antenna; and the fourth TX/RX channel to include the second BB circuit, a fourth FEM, and a fourth antenna. Then, in an example, the second TX/RX channel can further include the first RF circuit or a third RF circuit; and the fourth TX/RX channel can further include the second RF circuit or a fourth RF circuit.

In another example, the first TX/RX channel is configured to transmit and receive data in a different frequency band than the second TX/RX channel; and the third TX/RX channel is configured to transmit and receive data in a different frequency band than the fourth TX/RX channel. Then the example reconfigurable multi-radio bridge can configure the first TX/RX channel to transmit and receive data in a first frequency band selected from a 6 gigahertz (GHz) band, a 28 GHz band, and a 60 GHz band; and the second TX/RX channel is configured to transmit and receive data in a second frequency band selected from a 2.4 GHz band and a 5 GHz band.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" or "an implementation" does not imply that such embodiment or implementation is essential to the subject technology or that such embodiment or implementation applies to all configurations of the subject technology. A disclosure relating to an embodiment or implementation may apply to all embodiments or implementations, or one or more embodiments or implementations. An embodiment or implementation may provide one or more examples of the disclosure. A phrase such as "an embodiment" or "an implementation" may refer to one or more embodiments or implementations and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular implementations described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various implementations of the present disclosure have been described herein for purposes of illustration, and various modifications may be made without departing from the scope and spirit of the present disclosure. Accordingly, the various implementations disclosed herein are not intended to be limiting.

What is claimed is:

1. A method of dynamic route selection, the method comprising:
   collecting metrics for one or more wireless stations (STAs) in a network that includes the one or more STAs;
   receiving a packet that identifies a first STA of the one or more STAs as an intended destination of the packet;
   dynamically selecting a route of two or more routes in the network over which to send the packet based on the metrics, each of the two or more routes reaching the first STA, the route including both a first channel and a second channel; and
   sending the packet from a reconfigurable multi-radio bridge over the selected route toward the first STA by sending the packet substantially simultaneously over the first channel and the second channel.

2. The method of claim 1, wherein:
   the sending comprises sending the packet over a first route at a first time, the first route dynamically selected depending on first values of the metrics at the first time;
   the method further comprises dynamically selecting a second route of the two or more routes over which to send a second packet intended for the first STA based on the metrics at a second time, the second route dynamically selected depending on second values of the metrics at the second time.

3. The method of claim 1, wherein:
   the network further includes an access point (AP);
   selecting the route over which to send the packet comprises selecting a distributed multiple input multiple output (MIMO) route that includes both the first channel from the AP directly to the first STA and the second channel from the reconfigurable multi-radio bridge directly to the first STA; and
   sending the packet over the selected route comprises sending the packet over the distributed MIMO route that includes both the first channel and the second channel.

4. The method of claim 3, further comprising:
   deriving first precoders to use for the first channel and the second channel when operated as independent routes; and
   deriving second precoders to use for the first channel and the second channel when operated together as the distributed MIMO route.

5. The method of claim 1, wherein:
   the reconfigurable multi-radio bridge is configured to provide a backhaul link to a base station;
   the two or more routes include a first route that reaches the first STA through a backhaul relay link to a second reconfigurable multi-radio bridge and a second route that bypasses the second reconfigurable multi-radio bridge to reach the first STA;
   selecting the route comprises selecting the first route; and
   sending the packet from the reconfigurable multi-radio bridge over the selected route toward the first STA comprises sending the packet to the second reconfigurable multi-radio bridge over the backhaul relay link.

6. The method of claim 1, wherein the metrics include at least one of:
   channel state information (CSI);
   link quality;
   delay time;
   number of hops;
   jitter;
   supported modulation and coding scheme (MCS);
   received signal strength indicator (RSSI);
   clear channel assessment (CCA) level;
   interference;
   estimated throughput;
   airtime;
   traffic priority;
   route congestion; and
   bridge/WAP load.

7. A reconfigurable multi-radio bridge, comprising:
   a first reconfigurable radio comprising a first transmit/receive (TX/RX) channel and a second TX/RX channel, wherein the first reconfigurable radio is configured to selectively transmit and receive data on the first TX/RX channel or the second TX/RX channel; and
   a second reconfigurable radio comprising a third TX/RX channel and a fourth TX/RX channel, wherein the second reconfigurable radio is configured to selectively transmit and receive data on the third TX/RX channel or the fourth TX/RX channel,
   wherein to selectively transmit and receive data, the reconfigurable multi-radio bridge is configured to:
      collect metrics for one or more wireless stations (STAs) in a network that includes the one or more STAs;
      receive a packet from a base station via backhaul link that identifies a first STA of the one or more STAs as an intended destination of the packet;
      dynamically select a route of two or more routes in the network over which to send the packet based on the metrics, each of the two or more routes reaching the first STA, the selected route including both a first channel and a second channel; and
      send the packet from the reconfigurable multi-radio bridge over the selected route toward the first STA by sending the packet substantially simultaneously over the first channel and the second channel.

8. The reconfigurable multi-radio bridge of claim 7, wherein:
   send the packet comprises send the packet over a first route at a first time, the first route dynamically selected depending on first values of the metrics at the first time; and
   the reconfigurable multi-radio bridge is further configured to dynamically select a second route of the two or more routes over which to send a second packet intended for the first STA based on the metrics at a second time, the second route dynamically selected depending on second values of the metrics at the second time.

9. The reconfigurable multi-radio bridge of claim 7, wherein:
   the network further includes an access point (AP);
   select the route over which to send the packet comprises select a distributed multiple input multiple output (MIMO) route that includes both an AP-to-STA channel from the AP directly to the first STA and a radio-to-STA channel from the reconfigurable multi-radio bridge directly to the first STA; and
   send the packet over the selected route comprises send the packet over the distributed MIMO route that includes both the AP-to-STA channel and the radio-to-STA channel.

10. The reconfigurable multi-radio bridge of claim 9, wherein the reconfigurable multi-radio bridge is further configured to:

derive first precoders to use for the AP-to-STA channel and the radio-to-STA channel when operated as independent routes; and derive second precoders to use for the AP-to-STA channel and the radio-to-STA channel when operated together as the distributed MIMO route.

11. The reconfigurable multi-radio bridge of claim 7, wherein:
the reconfigurable multi-radio bridge is further configured to provide the backhaul link to the base station;
the two or more routes include a first route that reaches the first STA through a backhaul relay link to a second reconfigurable multi-radio bridge and a second route that bypasses the second reconfigurable multi-radio bridge to reach the first STA;
select the route comprises select the first route; and
send the packet from the reconfigurable multi-radio bridge over the selected route toward the first STA comprises send the packet to the second reconfigurable multi-radio bridge over the backhaul relay link.

12. The reconfigurable multi-radio bridge of claim 7, wherein:
the first TX/RX channel comprises a first baseband (BB) circuit, a first radio frequency (RF) circuit, a first front end module (FEM), and a first antenna;
the second TX/RX channel comprises the first BB circuit, a second FEM, and a second antenna;
the third TX/RX channel comprises a second BB circuit, a second RF circuit, a third FEM, and a third antenna; and
the fourth TX/RX channel comprises the second BB circuit, a fourth FEM, and a fourth antenna.

13. The reconfigurable multi-radio bridge of claim 7, wherein:
the first reconfigurable radio comprises a millimeter (mm) wave radio; and
the second reconfigurable radio comprises a centimeter (cm) wave radio.

14. The reconfigurable multi-radio bridge of claim 7, wherein:
the first reconfigurable radio is configured to operate in a 60 gigahertz (GHz) band; and
the second reconfigurable radio is configured to operate in at least one of a 2.4 GHz band, a 5 GHz band, or a 6 GHz band.

15. A reconfigurable multi-radio bridge system comprising:
a network;
a memory; and
a processor operatively coupled to the memory, wherein the processor is configured to:
collect metrics for one or more wireless stations (STAs) in a network that includes the one or more STAs;
receive a packet that identifies a first STA of the one or more STAs as an intended destination of the packet;
dynamically select a route of two or more routes in the network over which to send the packet based on the metrics, each of the two or more routes reaching the first STA, the route including both a first channel and a second channel;
derive a plurality of precoders to use for the selected route; and
send the packet from the reconfigurable multi-radio bridge over the selected route toward the first STA by sending the packet substantially simultaneously over the first channel and the second channel.

16. The reconfigurable multi-radio bridge system of claim 15, wherein:
send the packet comprises send the packet over a first route at a first time, the first route dynamically selected depending on first values of the metrics at the first time; and
the reconfigurable multi-radio bridge is further configured to dynamically select a second route of the two or more routes over which to send a second packet intended for the first STA based on the metrics at a second time, the second route dynamically selected depending on second values of the metrics at the second time.

17. The reconfigurable multi-radio bridge system of claim 15, wherein:
the network further includes an access point (AP);
select the route over which to send the packet comprises select a distributed multiple input multiple output (MIMO) route that includes both an AP-to-STA channel from the AP directly to the first STA and a radio-to-STA channel from the reconfigurable multi-radio bridge directly to the first STA; and
send the packet over the selected route comprises send the packet over the distributed MIMO route that includes both the AP-to-STA channel and the radio-to-STA channel.

18. The reconfigurable multi-radio bridge system of claim 17, wherein the reconfigurable multi-radio bridge is further configured to:
derive first precoders to use for the AP-to-STA channel and the radio-to-STA channel when operated as independent routes; and
derive second precoders to use for the AP-to-STA channel and the radio-to-STA channel when operated together as the distributed MIMO route.

19. The reconfigurable multi-radio bridge system of claim 15, wherein:
the reconfigurable multi-radio bridge is further configured to provide a backhaul link to a base station;
the two or more routes include a first route that reaches the first STA through a backhaul relay link to a second reconfigurable multi-radio bridge and a second route that bypasses the second reconfigurable multi-radio bridge to reach the first STA;
select the route comprises select the first route; and
send the packet from the reconfigurable multi-radio bridge over the selected route toward the first STA comprises send the packet to the second reconfigurable multi-radio bridge over the backhaul relay link.

20. The reconfigurable multi-radio bridge system of claim 19 comprising
a first reconfigurable radio comprising a millimeter (mm) wave radio; and
a second reconfigurable radio comprising a centimeter (cm) wave radio.

* * * * *